United States Patent
Guirguis et al.

(10) Patent No.: US 9,507,833 B2
(45) Date of Patent: *Nov. 29, 2016

(54) SYSTEMS AND METHODS FOR QUANTILE DETERMINATION IN A DISTRIBUTED DATA SYSTEM

(71) Applicant: SAS Institute Inc., Cary, NC (US)

(72) Inventors: Georges H. Guirguis, Cary, NC (US); Scott Pope, Raleigh, NC (US); Oliver Schabenberger, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,500

(22) Filed: Apr. 29, 2016

(65) Prior Publication Data

US 2016/0246853 A1  Aug. 25, 2016

Related U.S. Application Data

(63) Continuation-in-part of application No. 14/997,383, filed on Jan. 15, 2016, which is a continuation of application No. 13/482,095, filed on May 29, 2012, now Pat. No. 9,268,796.

(51) Int. Cl.
*G06F 17/30* (2006.01)

(52) U.S. Cl.
CPC ... *G06F 17/30536* (2013.01); *G06F 17/30545* (2013.01)

(58) Field of Classification Search
CPC ........................................................ G06F 17/10
USPC ........................................................ 707/752
See application file for complete search history.

(56) References Cited

U.S. PATENT DOCUMENTS

| | | |
|---|---|---|
| 5,018,088 A | 5/1991 | Higbie |
| 5,734,744 A | 3/1998 | Wittenstein et al. |
| 6,985,467 B2 | 1/2006 | Lomp et al. |
| 7,020,111 B2 | 3/2006 | Ozluturk et al. |
| 7,162,249 B2 | 1/2007 | Westphal |
| 7,219,034 B2 | 5/2007 | McGee et al. |
| 7,409,357 B2 | 8/2008 | Schaf et al. |
| 8,611,586 B1 | 12/2013 | Brodeur et al. |

(Continued)

OTHER PUBLICATIONS

Guirguis, Georges H., "Conformal Mapping: A Robust Method for Computing Quantiles", Communications in Statistics, Simulation and Computations, vol. 33, No. 4 (2004) pp. 991-1006.

(Continued)

*Primary Examiner* — Baoquoc N To
(74) *Attorney, Agent, or Firm* — Kilpatrick Townsend & Stockton LLP

(57) ABSTRACT

In accordance with the teachings described herein, systems and methods are provided for estimating quantiles for data stored in a distributed system. In one embodiment, an instruction is received to estimate a specified quantile for a variate in a set of data stored at a plurality of nodes in the distributed system. A plurality of data bins for the variate are defined that are each associated with a different range of data values in the set of data. Lower and upper quantile bounds for each of the plurality of data bins are determined based on the total number of data values that fall within each of the plurality of data bins. The specified quantile is estimated based on an identified one of the plurality of data bins that includes the specified quantile based on the lower and upper quantile bounds.

24 Claims, 19 Drawing Sheets

(56) References Cited

U.S. PATENT DOCUMENTS

| | | |
|---|---|---|
| 8,868,573 B2 | 10/2014 | Chu et al. |
| 9,268,796 B2 | 2/2016 | Pope et al. |
| 9,323,888 B2* | 4/2016 | Rava ................. G06F 19/22 |
| 2003/0088542 A1 | 5/2003 | McGee et al. |
| 2003/0118232 A1 | 6/2003 | Li et al. |
| 2006/0002364 A1 | 1/2006 | Westphal |
| 2009/0222243 A1 | 9/2009 | Zoldi et al. |
| 2010/0292995 A1 | 11/2010 | Bu et al. |
| 2013/0096011 A1* | 4/2013 | Rava ................. G06F 19/22 506/2 |
| 2013/0218909 A1 | 8/2013 | Chu et al. |
| 2014/0038830 A1* | 2/2014 | Srinivasan ........... C12Q 1/6883 506/2 |
| 2016/0070853 A9* | 3/2016 | Rava ................. G06F 19/22 506/2 |
| 2016/0210405 A1* | 7/2016 | Rava ................. C12Q 1/6827 |

OTHER PUBLICATIONS

Jain et al., "The $P^2$ Algorithm for Dynamic Calculation of Quantiles and Histograms Without Storing Observations", Simulation Modeling and Statistical Computing, (Oct. 1985) vol. 28, No. 10, pp. 1076-1085.

Raatikainen, Kimmo, "Simultaneous Estimation of Several Persentiles", University of Helsinki, Department of Computer Science, Helsinki, Finland, (Oct. 1986), pp. 159-164.

Non-Final Office Action of Jan. 5, 2015 for U.S. Appl. No. 13/482,095, 7 pages.

Non-Final Office Action of Jul. 2, 2015 for U.S. Appl. No. 13/482,095, 15 pages.

Notice of Allowance of Oct. 16, 2015 for U.S. Appl. No. 13/482,095, 15 pages.

* cited by examiner

| SERVER1 | | | |
|---|---|---|---|
| 25.7 | 71.9 | 41.0 | 10.6 | 50.1
| 12.0 | 17.3 | 92.4 | 7.7 | 90.7
| 30.0 | 85.5 | 26.5 | 29.9 | 57.0
| 23.9 | 63.0 | 56.5 | 74.6 | 1.1
| 6.7 | 87.6 | 49.1 | 91.2 | 41.3
| 13.1 | 8.5 | 76.5 | 74.7 | 39.8
| 94.2 | 98.3 | 98.4 | 21.0 | 95.5
| 84.5 | 83.1 | 96.1 | 17.3 | 77.5
| 84.2 | 18.7 | 28.5 | 87.1 | 17.7
| 95.0 | 28.9 | 30.0 | 31.7 | 14.3

402

| SERVER2 | | | | |
|---|---|---|---|---|
| 54.3 | 96.0 | 58.7 | 32.7 | 50.8
| 88.0 | 39.8 | 80.0 | 65.5 | 83.1
| 55.3 | 17.8 | 20.4 | 10.7 | 38.6
| 66.2 | 23.0 | 35.9 | 68.9 | 51.5
| 15.3 | 97.8 | 84.9 | 53.9 | 9.5
| 11.5 | 23.0 | 95.4 | 37.9 | 7.2
| 31.7 | 38.8 | 15.5 | 70.7 | 12.6
| 85.2 | 45.2 | 97.6 | 91.6 | 66.8
| 42.0 | 72.1 | 93.2 | 34.8 | 72.9
| 30.5 | 55.6 | 95.3 | 65.2 | 51.8

| BINS | SERVER 1 | SERVER 2 | COMBINED |
|---|---|---|---|
| BIN 1 (1.1 <= x < 25.45) | 14 | 11 | 25 |
| BIN 2 (25.45 <= x < 49.76) | 12 | 11 | 23 |
| BIN 3 (49.76 <= x < 74.07) | 5 | 16 | 21 |
| BIN 4 (74.07 <= x < 98.4) | 19 | 12 | 31 |

504 / 506 / 508 / 510

| | SERVER 1 | SERVER 2 | COMBINED RESULT |
|---|---|---|---|
| MINIMUM | 1.1 | 7.2 | 1.1 |
| MAXIMUM | 98.4 | 97.8 | 98.4 |
| COUNT | 50 | 50 | 100 |

FIG. 5A

Combined column percentages: 25%, 48%, 69%, 100%

| BINS | SERVER 1 | SERVER 2 | COMBINED |
|---|---|---|---|
| PRE-BIN (1.1 <= x < 74.07) | NOT REPORTED | NOT REPORTED | 69 (PREV. PASS) |
| BIN 4.1 (74.07 <= x < 80.14) | 4 | 1 | 5 |
| BIN 4.2 (80.14 <= x < 86.22) | 4 | 3 | 7 |
| BIN 4.3 (86.22 <= x < 92.30) | 4 | 2 | 6 |
| BIN 4.4 (92.30 <= x < 98.4) | 7 | 6 | 13 |

514 / 516 / 518 / 520

Combined column percentages: 69%, 74%, 81%, 87%, 100%

| | SERVER1 | SERVER2 | COMBINED RESULT |
|---|---|---|---|
| MINIMUM | 1.1 | 7.2 | 1.1 |
| MAXIMUM | 98.4 | 97.8 | 98.4 |
| COUNT | 50 | 50 | 100 |

602 / 604 / 606 / 608 / 610

| BINS | SERVER1 | MIN | MAX | SERVER2 | MIN | MAX | COMBINED | MIN | MAX | FOR BIN |
|---|---|---|---|---|---|---|---|---|---|---|
| BIN1 (1.1<=x<61.91) | 29 | 1.1 | 57.0 | 30 | 7.2 | 58.7 | 59 | 1.1 | 58.7 | 59% |
| BIN2 (61.91<=x<74.07) | 2 | 63.0 | 71.9 | 8 | 65.2 | 72.9 | 10 | 63.0 | 72.9 | 69% |
| BIN3 (74.07<=x<86.22) | 8 | 74.7 | 85.5 | 4 | 80.0 | 85.2 | 12 | 74.7 | 85.5 | 81% |
| BIN4 (86.22<=x<98.4) | 11 | 87.1 | 98.4 | 8 | 80.0 | 97.8 | 19 | 87.1 | 98.4 | 100% |

| BINS | SERVER1 | MIN | MAX | SERVER2 | MIN | MAX | COMBINED | MIN | MAX | FOR BIN |
|---|---|---|---|---|---|---|---|---|---|---|
| PRE-BIN (1.1<=x<74.7) | NR | NR | NR | NR | NR | NR | 69 | 1.1 | 74.7 | 69% |
| BIN3.1 (74.7<=x<81.45) | 3 | 74.7 | 77.5 | 1 | 80.0 | 80.0 | 4 | 76.5 | 80.0 | 73% |
| BIN3.2 (81.45<=x<82.8) | 0 | NR | NR | 0 | NR | NR | 0 | NA | NA | 73% |
| BIN3.3 (82.8<=x<84.15) | 1 | 83.1 | 83.1 | 1 | 83.1 | 83.1 | 2 | 83.1 | 83.1 | 75% |
| BIN3.4 (84.15<=x<85.5) | 3 | 84.2 | 85.5 | 2 | 84.9 | 85.2 | 5 | 84.2 | 85.5 | 80% |

SERVER 1

AMENDMENT I
CONGRESS SHALL MAKE NO LAW RESPECTING AN ESTABLISHMENT OF RELIGION, OR PROHIBITING THE FREE EXERCISE THEREOF, OR ABRIDGING THE FREEDOM OF SPEECH, OR THE PRESS; OR THE RIGHT OF THE PEOPLE PEACEABLY TO ASSEMBLE, AND TO PETITION THE GOVERNMENT FOR A REDRESS OF GRIEVANCES.

AMENDMENT II
A WELL REGULATED MILITIA, BEING NECESSARY TO THE SECURITY OF A FREE STATE, THE RIGHT OF THE PEOPLE TO KEEP AND BEAR ARMS, SHALL NOT BE INFRINGED.

AMENDMENT III
NO SOLDIER SHALL, IN TIME OF PEACE BE QUARTERED IN ANY HOUSE, WITHOUT THE CONSENT OF THE OWNER, NOR IN TIME OF WAR, BUT IN A MANNER PRESCRIBED BY LAW.

AMENDMENT IV
THE RIGHT OF THE PEOPLE TO BE SECURE IN THEIR PERSONS, HOUSES, PAPERS, AND EFFECTS AGAINST UNREASONABLE SEARCHES AND SEIZURES, SHALL NOT BE VIOLATED, AND NO WARRENTS SHALL ISSUE, BUT UPON PROBABLE CAUSE, SUPPORTED BY OATH OR AFFIRMATION, AND PARTICULARLY DESCRIBING THE PLACE TO BE SEARCHED, AND THE PERSONS OR THINGS TO BE SEIZED.

AMENDMENT V
NO PERSON SHALL BE HELD TO ANSWER TO A CAPITAL, OR OTHERWISE INFAMOUS CRIME, UNLESS ON A PRESENTMENT OR INDICTMENT OF A GRAND JURY, EXCEPT IN CASES ARISING IN THE LAND OR NAVAL FORCES, OR IN THE MILITIA, WHEN IN ACTUAL SERVICE IN TIME OF WAR OR PUBLIC DANGER; NOR SHALL ANY PERSON BE SUBJECT FOR THE SAME OFFENCE TO BE TWICE PUT IN JEOPARDY OF LIFE OR LIMB; NOR SHALL BE COMPELLED IN ANY CRIMINAL CASE TO BE A WITNESS AGAINST HIMSELF, NOR BE DEPRIVED OF LIFE, LIBERTY, OR PROPERTY, WITHOUT DUE PROCESS OF LAW; NOR SHALL PRIVATE PROPERTY BE TAKEN FOR PUBLIC USE, WITHOUT JUST COMPENSATION.

SERVER 2

AMENDMENT VI
IN ALL CRIMINAL PROSECUTIONS, THE ACCUSED SHALL ENJOY THE RIGHT TO A SPEEDY AND PUBLIC TRIAL, BY AN IMPARTIAL JURY OF THE STATE AND DISTRICT WHEREIN THE CRIME SHALL HAVE BEEN COMMITTED, WHICH DISTRICT SHALL HAVE BEEN PREVIOUSLY ASCERTAINED BY LAW, AND TO BE INFORMED OF THE NATURE AND CAUSE OF THE ACCUSATION; TO BE CONFRONTED WITH THE WITNESS AGAINST HIM; TO HAVE COMPULSORY PROCESS FOR OBTAINING WITNESSES IN HIS FAVOR, AND TO HAVE THE ASSISTANCE OF COUNSEL FOR HIS DEFENSE.

AMENDMENT VII
IN SUITS AT COMMON LAW, WHERE THE VALUE OF CONTROVERSY SHALL EXCEED TWENTY DOLLARS, THE RIGHT OF TRIAL BY JURY SHALL BE PRESERVED, AND NO FACT TRIED BY A JURY, SHALL BE OTHERWISE RE-EXAMINED IN ANY COURT OF THE UNITED STATES, THAN ACCORDING TO THE RULES OF THE COMMON LAW.

AMENDMENT VIII
EXCESSIVE BAIL SHALL NOT BE REQUIRED, NOR EXCESSIVE FINES IMPOSED, NOR CRUEL AND UNUSUAL PUNISHMENT INFLICTED.

AMENDMENT IX
THE ENUMERATION IN THE CONSTITUTION, OF CERTAIN RIGHTS, SHALL NOT BE CONSTRUED TO DENY OR DISPARAGE OTHERS RETAINED BY THE PEOPLE.

AMENDMENT X
THE POWERS NOT DELEGATED TO THE UNITED STATES BY THE CONSTITUTION, NOR PROHIBITED BY IT TO THE STATES, ARE RESERVED TO THE STATES RESPECTIVELY, OR TO THE PEOPLE.

|  | SERVER 1 | SERVER 2 | COMBINED RESULT |
|---|---|---|---|
| MINIMUM | a | a | a |
| MAXIMUM | WITNESS | WITNESSES | WITNESSES |
| COUNT | 266 | 196 | 462 |

FIG. 8B

| BIN COUNTS (MIN, MAX) 810 | SERVER A1 COUNT (LEFT BOUND, RIGHT BOUND) 812 | SERVER A2 COUNT (LEFT BOUND, RIGHT BOUND) 814 | COMBINED RESULTS COUNT (LEFT BOUND, RIGHT BOUND) 816 | CUMULATIVE SUM 818 |
|---|---|---|---|---|
| BIN 1 'a' <= x < 'g' | 74 (a, FREEDOM) | 69 (a, FOR) | 143 (a, FREEDOM) | 143 |
| BIN 2 'g' <= x < 'l' | 27 (GOVERNMENT, KEEP) | 21 (HAVE, JURY) | 48 (GOVERNMENT, KEEP) | 191 |
| BIN 3 'l' <= x < 'r' | 85 (LAND, QUARTERED) | 34 (LAW, PUNISHMENTS) | 119 (LAND, QUARTERED) | 310 |
| BIN 4 'r' <= x < 'WITNESSES | 80 (REDRESS, WITNESS) | 70 (RE-EXAMINED, WITH) | 150 (RE-EXAMINED, WITNESS) | |

| BIN COUNTS (MIN, MAX) 820 | SERVER A1 COUNT (LEFT BOUND, RIGHT BOUND) 822 | SERVER A2 COUNT (LEFT BOUND, RIGHT BOUND) 824 | COMBINED RESULT COUNT (LEFT BOUND, RIGHT BOUND) 826 | CUMULATIVE SUM 828 |
|---|---|---|---|---|
| BIN 1.2 'a' <= x < 'b' | 28 (a, ASSEMBLE) | 20 (a, AT) | 48 (a, AT) | 48 |
| BIN 2.2 'b' <= x < 'd' | 30 (BE, CRIMINAL) | 32 (BAIL, CRUEL) | 62 (BAIL, CRUEL) | 110 |
| BIN 1.3 'd' <= x < 'e' | 4 (DANGER, DUE) | 7 (DEFENSE, DOLLARS) | 11 (DANGER, DUE) | 121 |
| BIN 1.4 'e' <= x < 'FREEDOM' | 11 (EFFECTS, FREE) | 10 (ENJOY, FOR) | 11 (EFFECTS, FREE) | 142 |

FIG. 8C

| BIN COUNTS (MIN, MAX) | SERVER A1 COUNT (LEFT BOUND, RIGHT BOUND) | SERVER A2 COUNT (LEFT BOUND, RIGHT BOUND) | COMBINED RESULT COUNT (LEFT BOUND, RIGHT BOUND) | CUMULATIVE SUM |
|---|---|---|---|---|
| BIN 1.2.1 'BAIL' <= x < 'bl' | 16 (BE, BEING) | 9 (BAIL, BEEN) | 25 (BAIL, BEING) | 73 |
| BIN 1.2.2 'bl' <= x < 'bw' | 2 (BUT, BUT) | 0 (N/A) | 2 (BUT, BUT) | 75 |
| BIN 1.2.3 'bw' <= x < 'cg' | 6 (BY, CAUSE) | 9 (BY, CERTAIN) | 15 (BY, CERTAIN) | 90 |
| BIN 1.2.4 'cg' <= x < 'CRUEL' | 6 (COMPELLED, CRIMINAL) | 13 (COMMITTED, CRIMINAL) | 19 (COMMITTED, CRIMINAL) | 109 |

FIG. 8D

| BIN COUNTS (MIN, MAX) 840 | SERVER A1 COUNT (LEFT BOUND, RIGHT BOUND) 842 | SERVER A2 COUNT (LEFT BOUND, RIGHT BOUND) 844 | COMBINED RESULT COUNT (LEFT BOUND, RIGHT BOUND) 846 | CUMULATIVE SUM 848 |
|---|---|---|---|---|
| BIN 1.2.4.1 'COMMITTED' <= x < 'cpet' | 4 (COMPELLED, CONSENT) | 11 (COMMITTED, COURT) | 15 (COMMITTED, COURT) | 105 |
| BIN 1.2.4.2 'cpet' <= x < 'cpya' | 0 (N/A) | 0 (N/A) | 0 (N/A) | 0 |
| BIN 1.2.4.3 'cpya' <= x < 'cqqf' | 0 (N/A) | 0 (N/A) | 0 (N/A) | 0 |
| BIN 1.2.4.4 'cqqf' <= x < 'CRIMINAL' | 1 (CRIME, CRIME) | 1 (CRIME, CRIME) | 2 (CRIME, CRIME) | 107 |

| Index | Data Value |
|-------|------------|
| 1)    | 1          |
| 2)    | 2+         |
| 3)    | 2++        |
| 4)    | 2++        |
| 5)    | 2++        |
| 6)    | 2+++       |
| 7)    | 2+++       |
| 8)    | 3          |

FIG. 10

| Index (1101) | Left Point (1102) | Right Point (1103) | counts (1104) | cumulative (1105) | Lower Bound (1106) | Upper Bound (1107) |
|---|---|---|---|---|---|---|
| 0 | 1 | 1+1/8 | 1 | 1/8 | 1 | 1 |
| 1 | 1+1/8 | 1+2/8 | 0 | 1/8 | . | . |
| 2 | 1+2/8 | 1+3/8 | 0 | 1/8 | . | . |
| 3 | 1+3/8 | 1+4/8 | 0 | 1/8 | . | . |
| 4 | 1+4/8 | 1+5/8 | 0 | 1/8 | . | . |
| 5 | 1+5/8 | 1+6/8 | 0 | 1/8 | . | . |
| 6 | 1+6/8 | 1+7/8 | 0 | 1/8 | . | . |
| 7 | 1+7/8 | 2 | 0 | 1/8 | . | . |
| 8 | 2 | 2+1/8 | 6 | 7/8 | 2* | 2+++ |
| 9 | 2+1/8 | 2+2/8 | 0 | 7/8 | . | . |
| 10 | 2+2/8 | 2+3/8 | 0 | 7/8 | . | . |
| 11 | 2+3/8 | 2+4/8 | 0 | 7/8 | . | . |
| 12 | 2+4/8 | 2+5/8 | 0 | 7/8 | . | . |
| 13 | 2+5/8 | 2+6/8 | 0 | 7/8 | . | . |
| 14 | 2+6/8 | 2+7/8 | 0 | 7/8 | . | . |
| 15 | 2+7/8 | 3 | 0 | 7/8 | . | . |
| 16 | 3 | infinity | 1 | 8/8 | 3 | 3 |

FIG. 11

| Index 1201 | Left Point 1202 | Right Point 1203 | Counts 1204 | Cumulative 1205 | Lower bound 1206 | Upper bound 1207 |
|---|---|---|---|---|---|---|
| 0 | 1 | 2+ | 1 | 1/8 | 1 | 1 |
| 1 | 2+ | 2++ | 1 | 2/8 | 2+ | 2+ |
| 2 | 2++ | 2+++ | 3 | 5/8 | 2++ | 2++ |
| 3 | 2+++ | infinity | 3 | 8/8 | 2+++ | 3 |

SYSTEMS AND METHODS FOR QUANTILE DETERMINATION IN A DISTRIBUTED DATA SYSTEM

CROSS-REFERENCES TO RELATED APPLICATIONS

This application is a continuation-in-part of U.S. patent application Ser. No. 14/997,383, filed Jan. 15, 2016, which is a continuation of U.S. patent application Ser. No. 13/482,095, filed May 29, 2012, and issued as U.S. Pat. No. 9,268,796, which are hereby incorporated by reference in their entirety.

FIELD

The technology described in this patent document relates generally to computer-implemented systems for estimation or determination of quantiles in a distributed data system.

BACKGROUND

Quantiles are commonly used for various applications involving frequency data. Finding quantiles of a variate in small data sets is a relatively simple matter. As the number of observed values in the data set increases, however, the quantile problem becomes more difficult. Further complicating the problem is that large data sets are often stored in distributed systems in which different components (e.g., nodes) of the system have access to different portions of the data.

SUMMARY

In accordance with the teachings described herein, systems and methods are provided for estimating quantiles for data stored in a distributed system. In one embodiment, an instruction is received to estimate a specified quantile for a variate in a set of data stored at a plurality of nodes in the distributed system. A minimum data value and a maximum data value for the variate are identified from the set of data. A plurality of data bins for the variate is defined, wherein the plurality of data bins collectively range from the minimum data value to the maximum data value and each of the plurality of data bins is associated with a different range of data values in the set of data. A total number of data values in the set of data that fall within each of the plurality of data bins is determined. Lower and upper quantile bounds for each of the plurality of data bins are determined based on the total number of data values that fall within each of the plurality of data bins. One of the plurality of data bins is identified that includes the specified quantile based on the lower and upper quantile bounds. The specified quantile is estimated based on the identified one of the plurality of data bins.

The technology described in this patent document relates generally to computer-implemented systems for estimation or determination of quantiles in a distributed data system. In an embodiment, a computer-program product may be tangibly embodied in a non-transitory machine-readable storage medium. The non-transitory machine-readable storage medium may include instructions configured to cause a data processing apparatus to receive an instruction to determine a specified quantile for a variate in a set of data stored at nodes in the distributed system; define a number of data bins for the variate; define a set of data bins for the variate using the number of data bins; identify a specified data bin of the set of data bins that includes the specified quantile, wherein the specified data bin includes a specified lower quantile bound and a specified upper quantile bound; estimate the specified quantile based on the specified lower quantile bound and a specified upper quantile bound; determine a total number of data values in the specified data bin; compare the total number of data values in the specified data bin with the number of data bins; determine that the total number of data values is less than the number of data bins; define a set of sub data bins for the specified data bin, wherein: the sub data bins range from the specified lower quantile bound to the specified upper quantile bound, each of the sub data bins is associated with a different range of data values in the specified data bin, and the total number of sub data bins is equal to the total number of data values in the specified data bin; determine lower and upper sub quantile bounds for each of the sub data bins; identify one of the sub data bins that includes the specified quantile based on the lower and upper sub quantile bounds; and determine the specified quantile based on the identified one of the sub data bins.

In an aspect, the set of sub data bins for the specified data bin is predefined. In an aspect, each of the sub data bins includes one data value. In an aspect, the computer-program product further comprises instructions configured to cause the data processing apparatus to: determine a total minimum data value and a total maximum data value within each of the plurality of data bins, wherein the specified quantile is identified using the total minimum data value and the total maximum data value associated with the specified quantile. In an aspect, the instruction identifies one or more constraints, and the specified quantile is determined subject to the identified one or more constraints. In an aspect, the set of data bins for the variate include an equidistant set of grid points. In an aspect, the set of data bins for the variate include a non-uniform set of grid points. In an aspect, the non-uniform set of grid points is defined based on a location of the specified quantile within the set of data.

In another embodiment, a computing device may comprise one or more processors, and a memory having instructions stored thereon. The processor may cause the computing device to perform operations including receiving an instruction to determine a specified quantile for a variate in a set of data stored at nodes in the distributed system; defining a number of data bins for the variate; defining a set of data bins for the variate using the number of data bins; identifying a specified data bin of the set of data bins that includes the specified quantile, wherein the specified data bin includes a specified lower quantile bound and a specified upper quantile bound; estimating the specified quantile based on the specified lower quantile bound and a specified upper quantile bound; determining a total number of data values in the specified data bin; comparing the total number of data values in the specified data bin with the number of data bins; determining that the total number of data values is less than the number of data bins; defining a set of sub data bins for the specified data bin, wherein: the sub data bins range from the specified lower quantile bound to the specified upper quantile bound, each of the sub data bins is associated with a different range of data values in the specified data bin, and the total number of sub data bins is equal to the total number of data values in the specified data bin; determining lower and upper sub quantile bounds for each of the sub data bins; identifying one of the sub data bins that includes the specified quantile based on the lower and upper sub quantile bounds; and determining the specified quantile based on the identified one of the sub data bins.

In an aspect, the set of sub data bins for the specified data bin is predefined. In an aspect, each of the sub data bins includes one data value. In an aspect, the memory may further comprise instructions, which when executed by the one or more processors, cause the computing device to perform operations including determining a total minimum data value and a total maximum data value within each of the plurality of data bins, wherein the specified quantile is identified using the total minimum data value and the total maximum data value associated with the specified quantile. In an aspect, the instruction identifies one or more constraints, and the specified quantile is determined subject to the identified one or more constraints. In an aspect, the set of data bins for the variate include an equidistant set of grid points. In an aspect, the set of data bins for the variate include a non-uniform set of grid points. In an aspect, the non-uniform set of grid points is defined based on a location of the specified quantile within the set of data.

In another embodiment, a computer-implemented method may comprise receiving an instruction to determine a specified quantile for a variate in a set of data stored at nodes in the distributed system; defining a number of data bins for the variate; defining a set of data bins for the variate using the number of data bins; identifying a specified data bin of the set of data bins that includes the specified quantile, wherein the specified data bin includes a specified lower quantile bound and a specified upper quantile bound; estimating the specified quantile based on the specified lower quantile bound and a specified upper quantile bound; determining a total number of data values in the specified data bin; comparing the total number of data values in the specified data bin with the number of data bins; determining that the total number of data values is less than the number of data bins; defining a set of sub data bins for the specified data bin, wherein: the sub data bins range from the specified lower quantile bound to the specified upper quantile bound, each of the sub data bins is associated with a different range of data values in the specified data bin, and the total number of sub data bins is equal to the total number of data values in the specified data bin; determining lower and upper sub quantile bounds for each of the sub data bins; identifying one of the sub data bins that includes the specified quantile based on the lower and upper sub quantile bounds; and determining the specified quantile based on the identified one of the sub data bins.

In an aspect, the set of sub data bins for the specified data bin is predefined. In an aspect, each of the sub data bins includes one data value. In an aspect, the method may further comprise determining a total minimum data value and a total maximum data value within each of the plurality of data bins, wherein the specified quantile is identified using the total minimum data value and the total maximum data value associated with the specified quantile. In an aspect, the instruction identifies one or more constraints, and the specified quantile is determined subject to the identified one or more constraints. In an aspect, the set of data bins for the variate include an equidistant set of grid points. In an aspect, the set of data bins for the variate include a non-uniform set of grid points. In an aspect, the non-uniform set of grid points is defined based on a location of the specified quantile within the set of data.

BRIEF DESCRIPTION OF THE DRAWINGS

FIGS. 4-8E depict examples of how quantiles may be estimated using the systems and methods described herein.

FIG. 10 shows a table including a set of eight data points, based on these five distinct bit patterns, according to embodiments of the present technology.

FIG. 11 illustrates a table including data associated with seventeen different data bins associated with an iteration of the algorithm, according to embodiments of the present technology.

FIG. 12 illustrates a table 1200 including data associated with four different data bins associated with an iteration of the algorithm, according to embodiments of the present technology.

DETAILED DESCRIPTION

Figure 1:
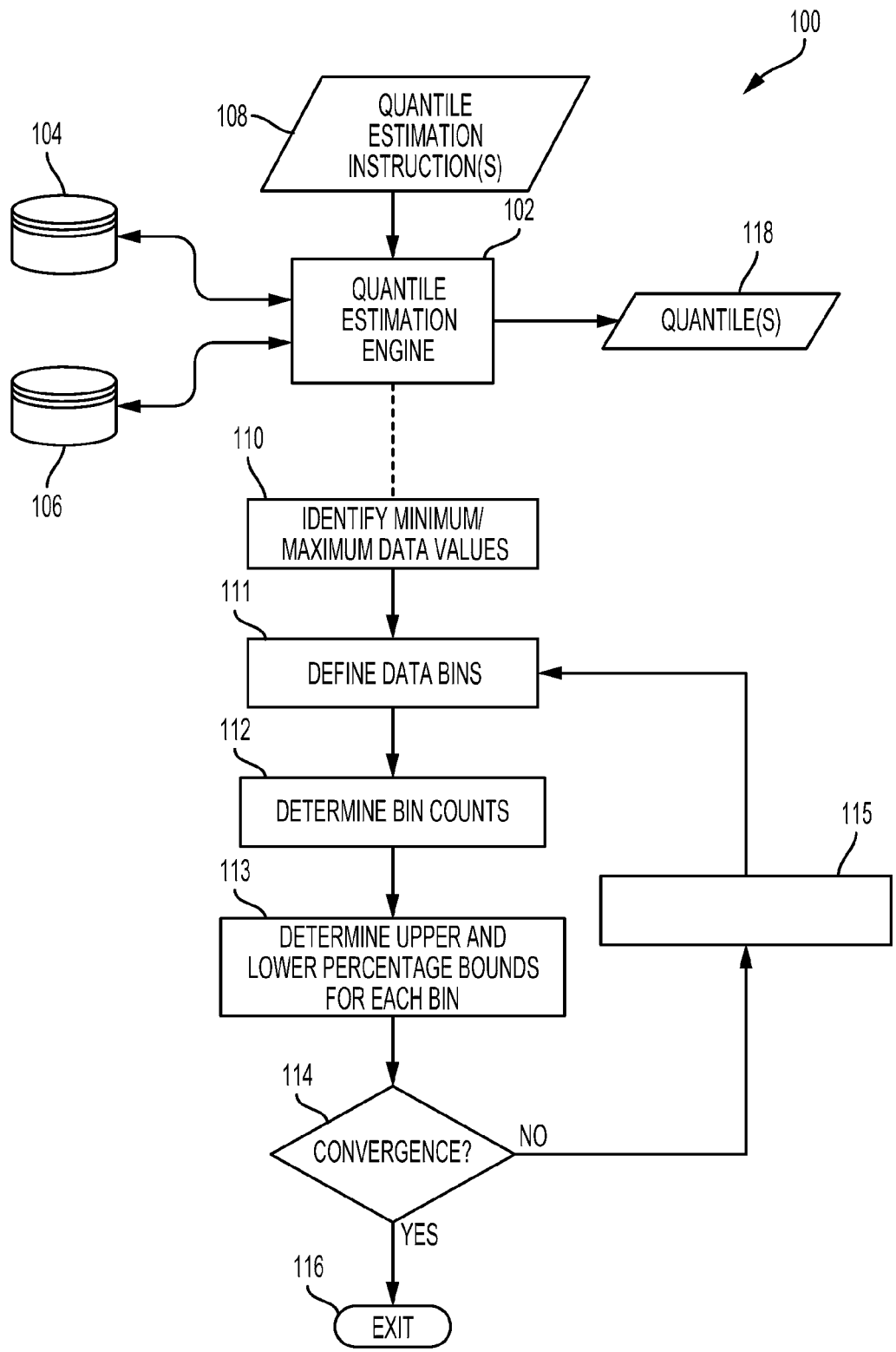
FIG. 1 is a block diagram of an example system for estimating quantiles for data stored in a distributed system.

FIG. 1 is a block diagram of an example system 100 for estimating quantiles for data stored in a distributed system. The system 100 includes a quantile estimation engine 102 that executes in a distributed system in which data is stored in a plurality of separate files at different nodes 104, 106 in the distributed system. As used herein, a distributed system consists of a plurality of separate computers and/or databases that are connected together through a network, and a node in the distributed system may include any one of the computers or databases in the distributed system. Typically, the nodes of a distributed system are connected using middleware such that the entire distributed system appears to a user as a single, integrated computing system. In the example illustrated in FIG. 1, the data of interest is stored in files at two separate nodes 104, 106 of the distributed system. The quantile estimation engine 102 may, for example, be a software application that is executed by a processor located either at nodes 104 or 106 or at a separate node in the distributed system. It should be understood that although two nodes are shown in the examples illustrated in FIGS. 1-3, a distributed system may include data stored in files located in more than two nodes.

In operation, the quantile estimation engine 102 receives an instruction 108 that identifies a quantile to be estimated for a variate in a set of data stored in a plurality of files at separate nodes 104, 106 in the distributed system. The quantile estimation instruction 108 may, for example, be received from user input or from another software module in the system.

Upon receiving the quantile estimation instruction 108, the system 100 executes the processes depicted at 110-116 in FIG. 1 in order to generate the quantile estimate 118 for the set of data. It should be understood that the operations of the method depicted in FIG. 1 may be performed entirely by the quantile estimation engine 102 or, alternatively, the quantile estimation engine 102 may cause one or more operations or portions of one or more operations to be performed by other nodes 104, 106 of the distributed system.

At 110, the system 100 performs a single pass through the set of data to determine the minimum and maximum values for the variate. At 111, the quantile estimation engine 102 defines a plurality of data bins for the variate. The data bins for a variate collectively range from the minimum data value to the maximum data value for the variate in the set of data, with each data bin being associated with a different range of data values in the set of data.

At 112, the system 100 performs another pass through the set of data to determine a count of the total number of data values for the variate that fall within each of the plurality of data bins. From the bin counts, the quantile estimation engine 102 determines, at 113, the upper and lower bounds on the percentages for each of the plurality of data bins. At 114, the quantile estimation engine 102 determines if one of the plurality of data bins has converged on the quantile specified in the quantile estimation instruction 108. For example, the quantile estimation engine 102 may be configured to estimate the quantile 118 to a predetermined level of precision. The level of precision may, for example, be based on the absolute error bound for quantiles in the bin. For instance, if the specified quantile is between the upper and lower quantile bounds for a bin and the absolute error (e.g., calculated as half the distance between the upper and lower bounds) is within the predetermined precision level, then the quantile estimation engine 102 may estimate the quantile 118 from the data values within the bin. For example, the quantile estimate 118 may be selected from a data value at the midpoint of the bin or as a weighted average of the data values in the bin.

If one of the plurality of data bins has not converged on the specified quantile, then, at 115, the quantile estimation engine 102 isolates one of the plurality of bins that includes the specified quantile. The method then returns to 111, where the quantile estimation engine 102 defines a new set of data bins that collectively range from the lower to upper quantile bounds of the isolated bin. The method then repeats operations 112 and 113 to make another pass through the data set with the redefined data bins. This process is repeated until a data bin converges on the specified quantile (possibly within a predetermined precision level), at which point the quantile estimate 118 is provided and the quantile estimation method ends at 116.

Figure 2:
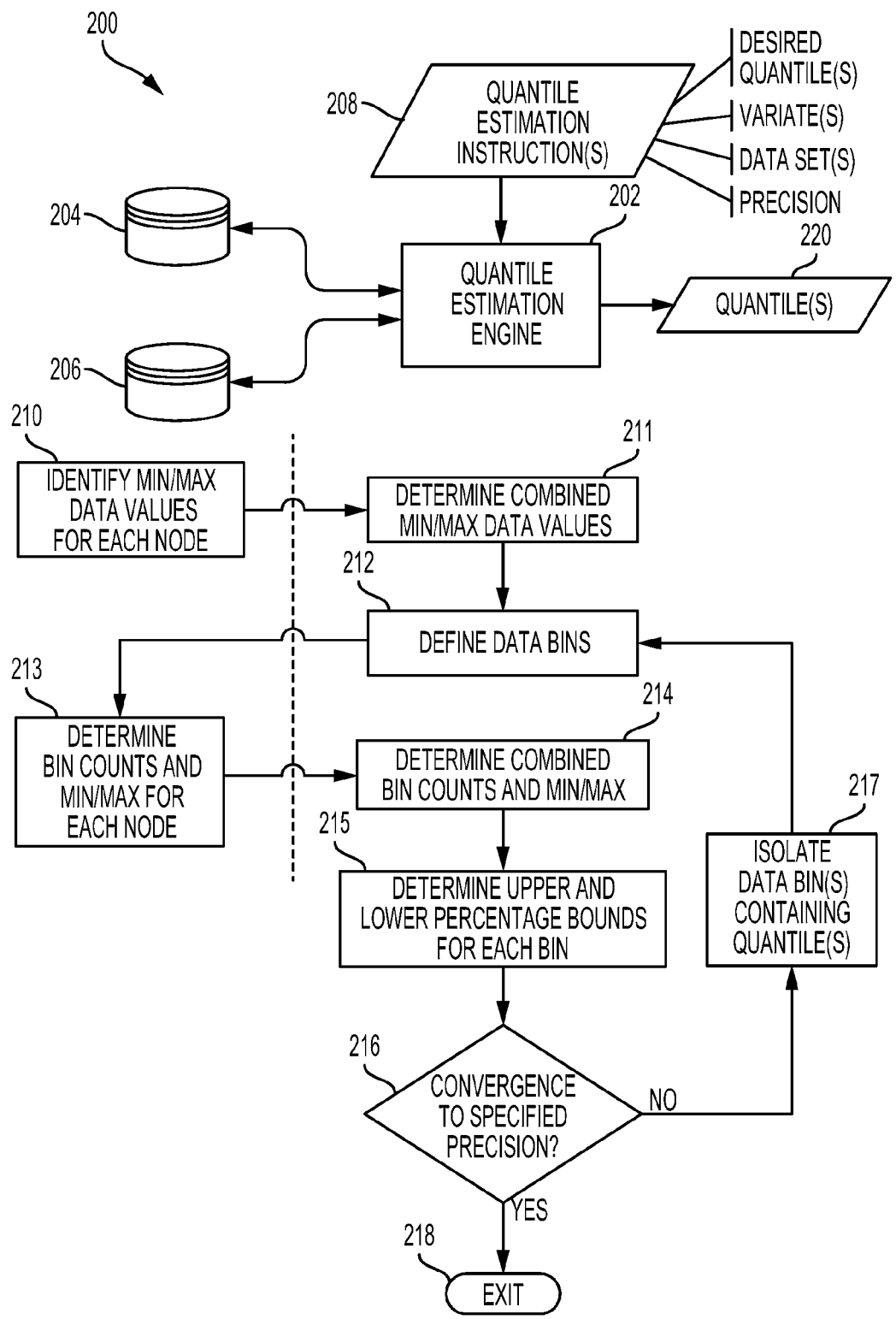
FIG. 2 is a block diagram of another example system 200 for estimating quantiles for data stored in a distributed system 200 in which data is stored in a plurality of separate files at different nodes 204, 206 in the distributed system.

FIG. 2 is a block diagram of another example system 200 for estimating quantiles for data stored in a distributed system 200 in which data is stored in a plurality of separate files at different nodes 204, 206 in the distributed system. In this example, instructions 208 received by the quantile estimation engine 202 may specify a single quantile for estimation or may specify multiple quantiles (e.g., a vector of quantiles) for estimation. As explained below, if multiple quantiles for a set of data are specified for estimation, then the quantile estimation engine 202 may simultaneously determine quantile estimates for each of the multiple quantiles. In addition, the quantile estimate engine 202 may be configured to simultaneously estimate quantiles for multiple variates and data sets. The quantile estimation instructions 208 may therefore identify multiple variates and multiple data sets for quantile estimation.

Upon receiving the quantile estimation instruction(s) 208, the system 200 executes the processes depicted at 210-218 in FIG. 2 in order to generate the quantile estimate(s) 220. In this example 200, a dotted line 222 is included to illustrate processes that may be performed by the quantile estimation engine 202 and processes that may be performed at the distributed nodes 204, 206. Specifically, in the illustrated example, the processes depicted to the left of the dotted line 222 are performed by the distributed nodes 204, 206 and the processes depicted to the right of the dotted line 222 are performed by the quantile estimation engine 202.

At operations 210 and 211, the system 200 performs a single pass through the set(s) of data to determine the minimum and maximum values for each variate. At 210, each node 204, 206 that holds portions of the data for the identified variate(s) determines the maximum and minimum values of the variate(s) for its data and sends this information back to the quantile estimation engine 202. At 211, the quantile estimation engine 202 combines the data counts and minimum and maximum values from the distributed nodes 204, 206 to determine the counts, minimum and maximum values for the entire set(s) of data.

At 212, the quantile estimation engine 202 defines a plurality of data bins for each variate. The data bins for a variate collectively range from the minimum data value to the maximum data value for the set of data, with each data bin being associated with a different range of data values in the set of data. If the quantile estimation instructions 208 identify multiple variates and/or data sets, then a different plurality of data bins are defined for each variate and data set. In addition, if multiple quantiles are included in the quantile estimation instructions, then a different plurality of data bins may be defined for each quantile.

At operations 213 and 214, the system 200 performs another pass through the set(s) of data to determine the number of data values that fall within each of the plurality of data bins for each variate. At 213, each node 204, 206 performs frequency counts of the variate for its data and projects the frequency counts into each bin. If the quantile estimation instructions 208 identify multiple variates and/or data sets, then the nodes 204, 206 may perform frequency counts and obtain maximum and minimum values for each variate and/or data set during the same data pass. The nodes 204, 206 send the bin counts and minimum and maximum values to the quantile estimation engine 202 which, at 214, combines the bin counts from each of the nodes 204, 206 to determine the total bin counts for each variate. In addition, in this example, each node 204, 206 also identifies, at operation 213, the minimum and maximum data values within each of the plurality of data bins for each variate and returns these minimum/maximum values to the quantile estimation engine 202, which combines the minima and maxima from each node 204, 206 at operation 214. In this way, the combined minimum and maximum values for each bin may be used by the quantile estimation engine 202 to help identify the location of the desired quantile and potentially speed up the convergence process.

At 215, the quantile estimation engine 202 determines the upper and lower bounds on the percentages for each of the plurality of data bins based on the bin counts. The quantile estimation engine 202 may then determine, at 216, if one of the plurality of data bins has converged, to a predetermined precision level, on the quantile(s) specified in the quantile estimation instruction 208. As illustrated, the precision level necessary for convergence may, for example, be included in the quantile estimation instruction 208. If one of the plurality of data bins has not converged on the specified quantile(s), then, at 217, the quantile estimation engine 202 isolates one of the plurality of bins that includes the specified quantile(s), and returns to operation 212 to define a new set of data bins that include the data values from the isolated bin. This process is repeated until a data bin converges on the specified quantile(s), at which point a quantile estimate 220 is determined from the data values in the bin, and the method ends at 218.

Figure 3:
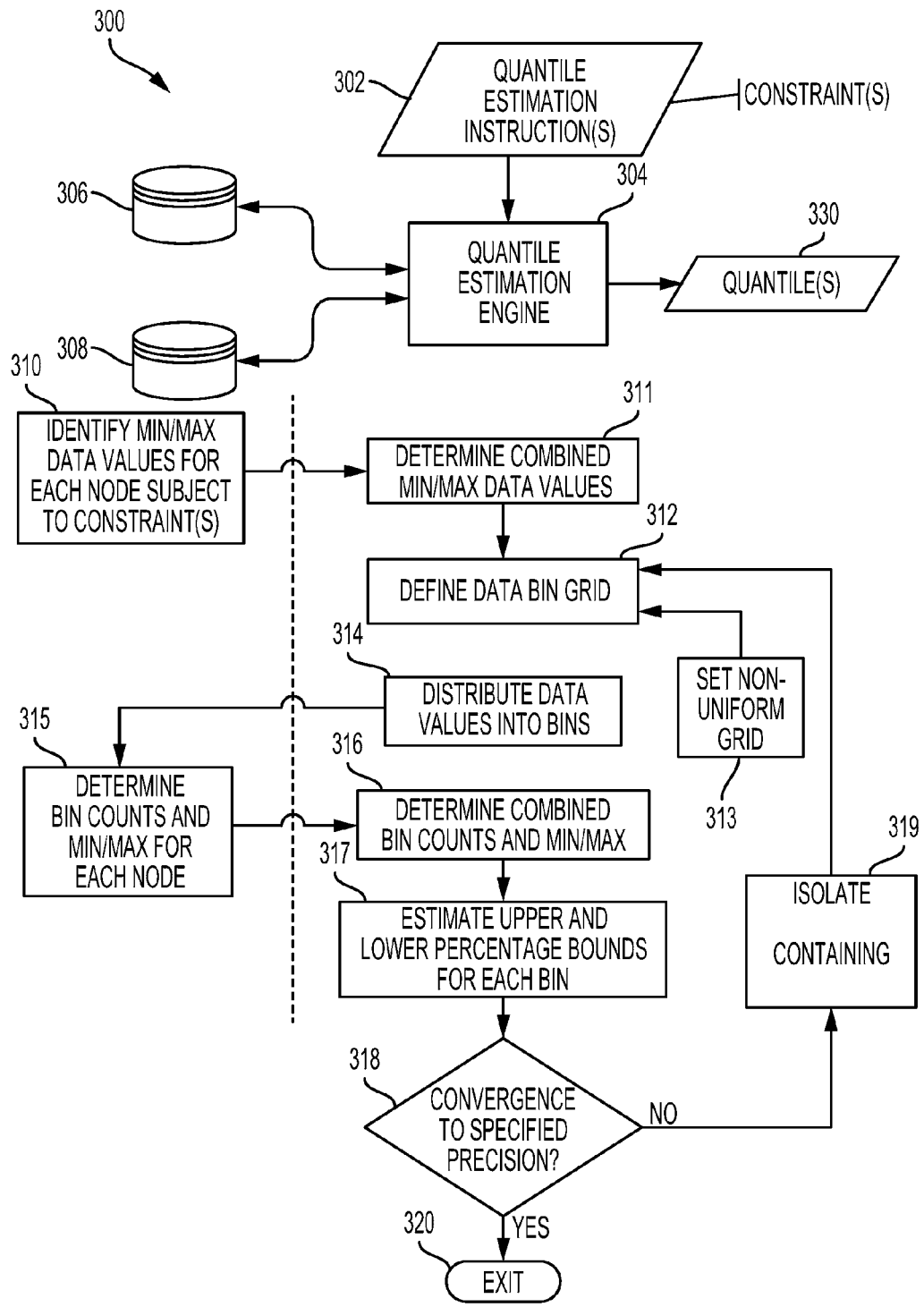
FIG. 3 is a block diagram of another example system 300 for estimating quantiles for data stored in a distributed system 300.

FIG. 3 is a block diagram of another example system 300 for estimating quantiles for data stored in a distributed system 300. In this example, the instructions 302 received by the quantile estimation engine 304 may also include one or more constraints to limit the data values included in the quantile estimation. For instance, the constraint(s) may limit the quantile estimation to one or more subcategories of data for the identified variate(s). As an example, the constraint(s) could limit the quantile estimation to data values for a variate from a certain geographic region, during a certain time period, or based on some other criteria. In addition, the example illustrated in FIG. 3 may establish non-uniform data bins, for instance to help speed up the convergence process.

In operation, the system 300 depicted in FIG. 3 executes the processes depicted at operations 310-319 upon receiving the quantile estimation instruction(s) 302. Again in this example 300, a dotted line 332 is included to illustrate processes that may be performed by the quantile estimation engine 304 (depicted to the right of the dotted line) and processes that may be performed at the distributed nodes 306, 308 (depicted to the left of the dotted line).

At operations 310 and 311, the system 300 performs a single pass through the set(s) of data to determine the minimum and maximum values for each variate, subject to any constraints identified in the quantile estimation instructions 302. Specifically, at 310, each node 306, 308 that holds portions of the data for the identified variate(s) determines the maximum and minimum values of the variate(s) for its data, subject to any constraints, and sends this information back to the quantile estimation engine 304. For example, if the quantile estimation instruction 302 includes a constraint that identifies a particular geographic region, then each node 306, 308 determines the minimum and maximum values of the variate(s) within its data that are associated with the identified geographic region. At 311, the quantile estimation engine 304 combines the data counts from the distributed nodes 306, 308 to determine the minimum and maximum values for the entire set(s) of data.

At 312, the quantile estimation engine 304 defines a grid size and distribution for a plurality of data bins for each variate. A grid for a set of data bins, as used herein, is the set of points that define the bounds of the data bins. That is, a set of data bins for a variate collectively include the data values between a minimum value and a maximum value. The set of points between the minimum and maximum values that define the bounds of each bin are referred to as the grid, where the grid size refers to the number of points in the grid and the grid distribution refers to where each of the set of grid points are located. (See, e.g., the examples described below with reference to FIGS. 4-8E). A grid for a set of data bins may be uniform or non-uniform. A non-uniform grid may, for example, be defined based on some known or calculated information regarding the likely position of the desired quantile within the data. For example, a non-uniform grid may be based on information obtained from a previous data pass (e.g., while isolating a data bin at 319.) In another example, a non-uniform data grid may be established by applying a known quantile algorithm, such as conformal mapping, and using the resultant data to include likely quantile values in the same bin. In another example, a non-uniform grid distribution may be used to isolate one or more outlier data values. In the example illustrated in FIG. 3, one or more of these processes to define a non-uniform grid may be performed at process operation 313. Once the grid is defined, the data values are distributed into the plurality of bins at 314.

At operations 315 and 316, the system 300 performs another pass through the set(s) of data to determine the number of data values that fall within each of the plurality of data bins for each variate, along with the minimum and maximum data values within each bin. At 315, each node 306, 308 performs frequency counts of the variate and projects the frequency counts into each bin. Each node 306, 308 also determines the minimum and maximum data values in each of the plurality of bins for each variate. The nodes 306, 308 then send the bin counts and the minimum and maximum values to the quantile estimation engine 304, which combines them at 316 to determine total bin counts and minimum/maximum values for each variate At 317, the quantile estimation engine 304 determines the upper and lower bounds on the percentages for each of the plurality of data bins based on the bin counts. The quantile estimation engine 304 may then determine, at 318, if one of the plurality of data bins has converged (e.g., to a predetermined precision level) on the specified quantile(s). If one of the plurality of data bins has not converged on the specified quantile(s), then, at 319, the quantile estimation engine 304 isolates one of the plurality of bins that includes the specified quantile(s), and returns to operation 312 to define a new data grid that includes the data values from the isolated bin. This process is repeated until a data bin converges on the specified quantile(s), at which point a quantile estimate 330 is determined from the data values in the bin, and the method ends at 320.

FIGS. 4-6C depict a first example of how a quantile may be estimated using the systems and methods described herein. FIG. 4 illustrates example data values for a variate that are split between two nodes (server 1 and server 2) 402, 404 in a distributed system. In this example, each data value represents an observed value for the same variate (the observations have been arranged in multiple columns for readability.) In total, the example includes 100 observed data values, with 50 observations stored at each of the two nodes 402, 404. The goal of the illustrated example is to estimate the 75% quantile for the example set of data shown in FIG. 4. The exact answer to this query is 83.1.

FIG. 5A illustrates an example of data that may be obtained from a first pass through the data shown in FIG. 4. As illustrated, the first node (server 1) determines that its stored data for the variate includes a count of 50 data values with a minimum data value of 1.1 and a maximum data value of 98.4. The second node (server 2) in the illustrated example determines that its stored data for the variate includes a count of 50 data values with a minimum data value of 7.2 and a maximum data value of 97.8. As shown, combined results may be determined (e.g., by a centralized node) from the data from the first and second nodes. In the illustrated example, the combined results include a total of 100 data values with a minimum value of 1.1 and a maximum value of 98.4.

FIG. 5B illustrates an example of how data bins may be defined based on the minimum and maximum data values and how bin counts may be determined from a second pass through the data shown in FIG. 4. In this example, the data bins are defined with a grid size of 3 and with a uniform distribution. Equally spacing 3 points (rounded to 2 decimal places) between the minimum (1.1) and the maximum (98.4) data values, results in grid points of 25.45, 49.76 and 74.07. This results in four data bins, as illustrated in column 502 in FIG. 5B. In a second pass through the data, the distributed nodes (server 1 and server 2) perform a count of the number of data values and the minimum and maximum values in each bin and return the results to the centralized node (e.g., the quantile estimation engine), as illustrated in columns 504 and 506. The centralized node then combines the results, as illustrated in column 508, and determines the quantile bounds for each bin, as shown in column 510. For instance, in the illustrated example, the upper quantile bound for Bin 1 represents the 25% quantile [Bin 1 Count (25)/Total Count (100)], the upper quantile for Bin 2 represents the 48% quantile [Sum of Bin 1 and 2 Counts (25+23)/Total Count (100)], and so on. From this information, the centralized node can determine that the desired 75% quantile must be included within Bin 4, which has a lower quantile bound representing the 69% quantile and an upper bound representing the 100% quantile. If the data range within Bin 4 meets the desired level of precision, then a quantile estimate may be determine from the information shown in FIG. 5B. For example, the value at the mid-point of Bin 4 (74.07≤x≤98.4) may be selected, resulting in an estimated 75% quantile of 86.24. However, if greater precision is desired, then Bin 4 may be further refined into a new set of data bins, as illustrated in FIG. 5C.

In FIG. 5C, the data from the isolated bin (Bin 4) is separated into four new uniform bins (Bins 4.1-4.4), as shown in col. 512. In a third pass, the distributed nodes (server 1 and server 2) perform a count of the data values in each of the redefined bins and return the results to the centralized node, as illustrated in columns 514 and 516. The counts are then combined, as shown in column 518, and the quantile bounds for each bin are calculated, as shown in column 520. The centralized node may now isolate the desired 75% quantile to Bin 4.2, which has a lower bound of 80.14 and an upper bound of 86.22. The actual quantile may reside anywhere within Bin 4.2. The midpoint of the bin, 83.18, may be selected as the estimated 75% quantile, or further iterations could be performed to refine the estimate. In this example, each added iteration would reduce the error by a factor of at least ¼.

FIG. 6A-6C illustrate another example using the data from FIG. 4, but with a non-uniform grid. Again, the goal of the example is to estimate the 75% quantile for the data in FIG. 4. FIG. 6A illustrates the minimum and maximum data values obtained from a first pass through the data, which is the same as in the uniform grid example shown in FIG. 5A. A non-uniform grid is then established, which for this example includes grid points at 62.5%, 75% and 87.5% of the distance from the lower bin value to the upper bin value. These grid points may, for example, have been selected to cluster the bins around where the desired 75% quantile should be located if the distribution was uniform. The resulting non-uniform bins (Bin1-Bin4) are illustrated in column 602 of FIG. 6B.

In a second pass through the data, the distributed nodes (server 1 and server 2) perform a count of the number of data values and minimum and maximum values in each bin and return the results to the centralized node, as illustrated in columns 604 and 606. The centralized node then combines the results, as illustrated in column 608, and determines the quantile bounds for each bin, as shown in column 610. FIG. 6B also tracks the minimum and maximum values within each bin, which may, for example, be used in the creation of a non-uniform grid to narrow the span of bins generated in further iterations.

From this information, the centralized node can determine that the desired 75% quantile must be included within Bin 3, which has a lower quantile bound of 74.07% and an upper bound of 85.5. If the data range within Bin 3 meets the desired level of precision, then a quantile estimate may be determine from the information shown in FIG. 6B. For example, the value at the mid-point of Bin 3 (74.07≤x≤86.22) may be selected, resulting in an estimated 75% quantile of 80.15. However, if greater precision is desired, then Bin 3 may be further refined into a new set of data bins, as illustrated in FIG. 6C.

In FIG. 6C, the data from the isolated bin (Bin 3) is separated into four uniform bins (Bins 3.1-3.4), as shown in col. 612. In other examples, however, information regarding the likely position of the quantile within the isolated bin could be used to separate the isolated bin into another non-uniform set of data bins. In a third pass, the distributed nodes (server 1 and server 2) perform a count of the data values in each of the redefined bins and return the results to the centralized node, as illustrated in columns 614 and 616. The counts are then combined, as shown in column 618, and the quantile bounds for each bin are calculated, as shown in column 620. In the illustrated example, the process has converged on the exact 75% quantile of 83.1, located in Bin 3.3.

FIGS. 7-8E depict another example in which the data of interest is non-numerical. In this example, the data of interest is the text of the U.S. Bill of Rights, which is stored at two separate nodes (server 1 and server 2) in a distributed system, as illustrated in FIG. 7. Specifically, the text from Amendments I-V is stored in a file located at a first node (server 1) 702 and the text from Amendments VI-X is stored in a file located at a second node (server 2) 704. This example finds the 23% quantile of the words in the Bill of Rights. That is, the example determines the word that appears in the Bill of Rights that follows alphabetically 23% of all words appearing in the Bill of Rights.

It should be understood that there is a technicality involved with character data that isn't involved with numerical data. Depending on the number of datum, there may not be a datum for which 23% of the total data are less. Consider, for instance, the following example:

Data={1, 2, 3, 4, 5, 6, 7, 8, 9, 10}, Desired quantile=23%.

In this data set, 20% of the data is less than or equal to 2, 30% of the data is less than or equal to 3. In practice, some systems report the 23% quantile to be 2, some report 3, some report the average 2.5, others report an interpolated value 2.3, and still others report some other interpolated number between 2 and 3.

Interpolation of character data typically does not give meaningful results. Instead, one or the two words adjacent to the desired percentile are reported. The character equivalent to the numerical example set forth above is:

Data={a, b, c, d, e, f, g, h, i, j}, Desired quantile=23%.

The answer to this example could be either 'b' or 'c'.

To create the data bin boundaries for character data, a scheme may be used to interpolate character data. The bin boundaries will not be meaningful words under the interpolation scheme. However, the maximum and minimum words (alphabetically) may be stored for each bin.

FIG. 8A illustrates the minimum and maximum words obtained from a first pass through the data. As shown, the first node (server 1) determines that its stored data includes a count of 266 words with a minimum word (alphabetically) of "a" and a maximum word of "witness." The second node (server 2) in the illustrated example determines that its stored data includes a count of 196 words with a minimum word of "a" and a maximum word of "witnesses." As illustrated, the combined results may then be determined (e.g., by a centralized node), resulting in a combined total of 462 words with a minimum of "a" and a maximum of "witnesses." With a total of 462 words in the stored data, the example is looking for word number 462*0.23=106.26, to locate the 23% quantile. The example will therefore report words 106 and 107.

In one example, to create the bin points for the character data each word may be mapped to an integer. This may be accomplished, for example, by locating the longest word in the data (in this case "establishment" with 13 letters) and consider each word as a number, in base 26, created by left-justifying the word with a=0, b=1, c=2, z=25. This reduces the bin creating process to the same problem as the numerical examples.

To reduce the number of comparisons, a minimum number of alphabetic digits may be determined in order to arrive at a desired number of distinct bins. For instance, to provide 3 bin boundaries between 'a' and 'witnesses', bins are only necessary between 'a'=0 and 'w'=22. The 25% bin boundary would therefore be (22−0)*0.25=5.5 (between 'f' and 'g', which we can round to 'g'); the 50% bin boundary would be (22−0)*0.5=11 (T), and the 75% bin boundary would be (22−0)*0.75=16.5 (between 'q' and 'r', which rounds to 'r'). These resulting bins are illustrated in FIG. 8B, at column 810.

In a second pass through the data, the distributed nodes (server 1 and server 2) perform a count of the number of data values in each bin along with the minimum and maximum data values, as shown in columns 812 and 814 of FIG. 8B. The centralized node then combines the results, as illustrated in column 816, and determines the cumulative sum for each bin, as shown in column 818. In the illustrated example, the cumulative sum of the first bin is 143, therefore the desired quantile is located in Bin 1 between the words 'a' and 'freedom.' Bin 1 may then be divided into a new set of data bins to further isolate the desired quantile, as illustrated in FIG. 8C.

In FIG. 8C, the data from the isolated bin (Bin 1) is separated into four new bins (Bins 1.1-1.4), as shown at column 820. In a third data pass, the distributed nodes (server 1 and server 2) determine a data count and minimum/maximum data values in each of the redefined bins, and return the results to the centralized node, as illustrated in columns 822 and 824. The counts are then combined, as shown in column 826, and the cumulative sum for each bin is determined, as shown in column 828. In this example, the cumulative sum of the first two bins is 110, therefore the desired quantile is located in Bin 1.2 between the words 'bail' and cruel.' To further isolate the quantile, Bin 1.2 may be separated into four more bins, as shown in FIG. 8D.

In FIG. 8D, the data from the isolated bin (Bin 1.2) is separated into four new bins (Bins 1.2.1-1.2.4), as shown at column 830. In a fourth data pass, the distributed nodes (server 1 and server 2) determine a data count and minimum/maximum data values in each of the redefined bins, and return the results to the centralized node, as illustrated in columns 832 and 834. The counts are then combined, as shown in column 836, and the cumulative sum for each bin is determined, as shown in column 838. From this information, it can be seen that the quantile is located in Bin 1.2.4 between the words 'committed' and criminal.' To further isolate the quantile, Bin 1.2.4 may be separated into four more bins, as shown in FIG. 8E.

In FIG. 8E, the data from the isolated bin (Bin 1.2.4) is separated into four new bins (Bins 1.2.4.1-1.2.4.4), as shown at column 840. In a fifth data pass, the distributed nodes (server 1 and server 2) determine a data count and minimum/maximum data values in each of the redefined bins, and return the results to the centralized node, as illustrated in columns 842 and 844. The counts are then combined, as shown in column 846, and the cumulative sum for each bin is determined, as shown in column 848. In the illustrated example, the process has converged on the desired 23% quantile (i.e., the $106^{th}$ or $107^{th}$ word alphabetically) in Bin 1.2.4.4, which is the word 'crime'.

Figure 9:
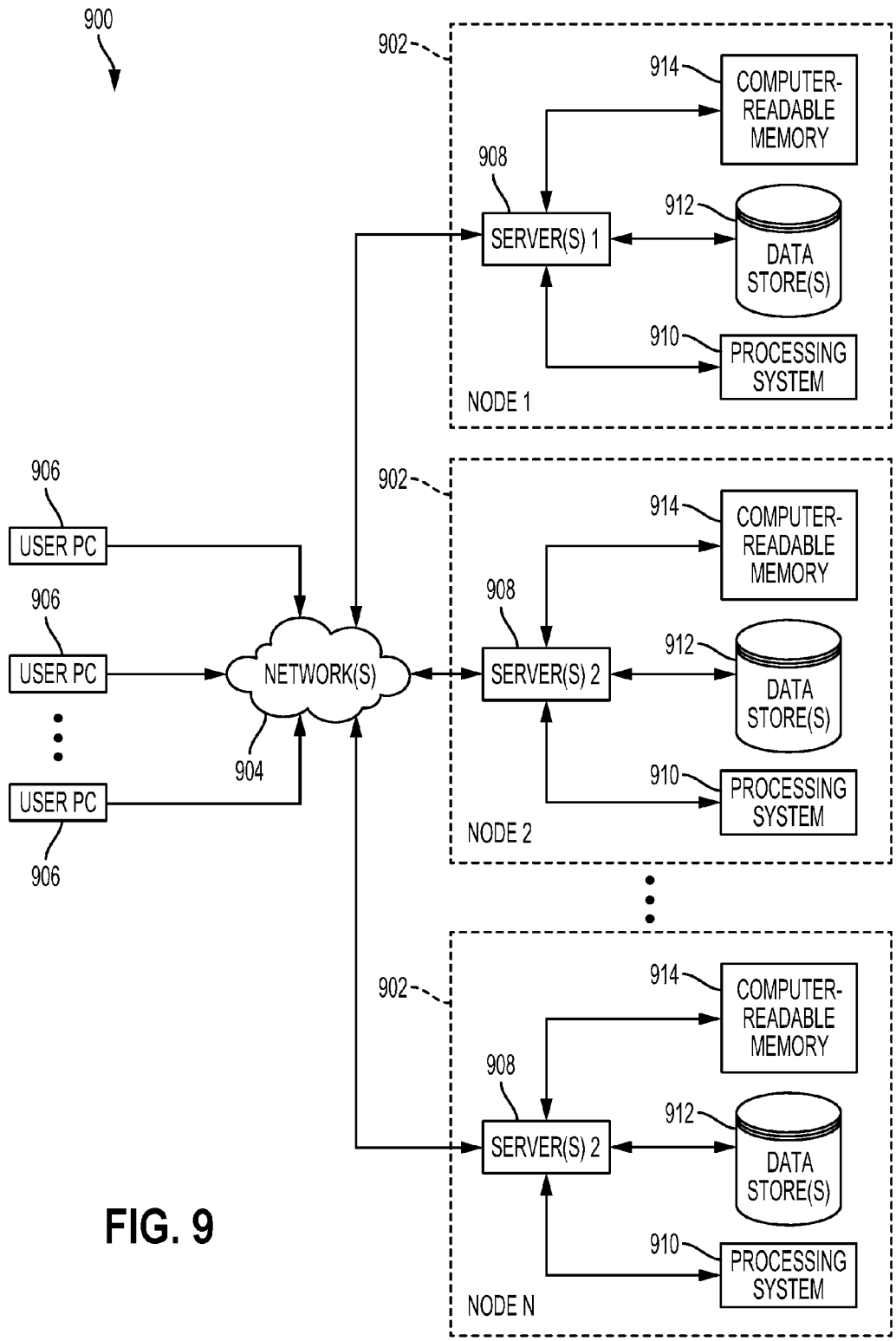
FIG. 9 depicts an example of a distributed system that may be used for estimating quantiles.

FIG. 9 depicts an example of a distributed system 900 that may be used for estimating quantiles. The distributed system 900 includes a plurality of nodes 902 that are connected together though one or more networks 904 and which may be accessed over the network(s) 904 by one or more computers or network terminals 906. Each node 902 may include one or more servers 908 executing data storage and retrieval software on a processing system 910. Each node 902 may also include one or more data stores 912 and/or computer readable medium 914. One of the nodes 902 may, for example, be a centralized node that executes a quantile estimation engine, as described herein. In addition, the nodes 902 of the distributed system 900 may be connected using middleware (not shown) such that the entire distributed system 900 appears to a user as a single, integrated computing system.

Referring back to FIG. 2, for example, the quantile estimation engine 202 may determine, at operation 216, if one of the plurality of data bins has converged, to a predetermined precision level, on the quantile(s) specified in the quantile estimation instruction 208. If one of the plurality of data bins has not converged on the specified quantile(s), then, at 217, the quantile estimation engine 202 isolates one of the plurality of bins that includes the specified quantile(s), and returns to operation 212 to define a new set of data bins that include the data values from the isolated bin. This process is repeated for one or more iterations until a data bin converges on the specified quantile(s), at which point a quantile estimate 220 is determined from the data values in the bin, and the method ends at 218.

For each iteration in the process described above in FIG. 2, the number of data values in the isolated bin is a smaller number than the total number of data values in the variate across all of the bins. This is because each of the bins other than the isolated bin also include a certain number of data values. Therefore, the number of data values included in each subsequent iteration is less than the number of data values included in each previous iteration. Since the number of data bins, or intervals associated with each of the defined data bins, may be the same for each iteration, eventually the number of data bins (or intervals) to be used in an iteration may exceed the number of data values available for that iteration. In such a situation, that iteration may not be able to be executed, and the algorithm may be forced to terminate. The algorithm may be forced to terminate if there are not enough data values for the number of data bins (the number of data bins may be, for example, predetermined before the iteration begins). In other words, during operation 212 of process 200 when the sub data bins are being defined for a given iteration, the sub data bins may not be able to be defined. The sub data bins may not be able to be defined because there are too many data bins to fit within the range of data values in the isolated data bin (i.e., the data bin isolated from the previous iteration) to define each sub data bin when using the number of sub data bins equal to the number of data bins used in the previous iteration(s).

One or more of the methods herein describe estimating quantiles for data stored in a distributed system. For example, estimating quantiles may include identifying a quantile to be estimated for a variate in a set of data, and then converging on the specified quantile using one or more passes to identify a bin (one bin out of a set of bins used in each pass) containing the specified quantile. As noted above, this process may be terminated if the predetermined number of bins for the iteration exceeds the number of data points available (from the identified data bin in the last iteration) to be distributed across the data bins in the subsequent iteration. In other words, the process may not move on to the next iteration if there are not enough data values for the number of assigned data bins. However, since more than one data value may be included in the subsequent iteration, an exact quantile may not be determined if the process is terminated at this time. In other words, if the process was able to continue for one more iteration, and each of the remaining data values were assigned to a data bin, then selecting (by converging on) another data bin in that next iteration would allow the system to determine an exact quantile.

To solve this problem, or in other words to prevent the algorithm from terminating before an exact quantile is determined, the predetermined number of data bins (or intervals) used in the subsequent iteration may be reduced to be equal to the number of data values remaining after the previous iteration is complete. For example, if the predetermined number of intervals used for each pass was 128 intervals, but there were only 100 data values included in the selected data bin from the previous iteration (and therefore only 100 data values remaining in the convergence process), then the predetermined number of intervals used for the next pass may be reduced from 128 to 100. This reduction would allow for the number of data values to each be assigned to one data bin, but for there to be no excess data bins that would be left without a data point included in it.

In an example, consider a data set with five distinct bit patterns: 1, 2+, 2++, 2+++ and 3. The bit patterns may be designed for the purposes of this example as follows: 2+ is the smallest value >2; 2++ is the smallest value >2+; 2+++ is the smallest value >2++; 2, 2+, 2++ and 2+++ are consecutive bit patterns; the interval [2,2+) has only 1 point with bit pattern corresponding to 2, where 2+ is not included in the interval [2,2+); the interval [2+,2++) has only 1 point with bit pattern corresponding to 2+; the interval [2++, 2+++) has only 1 point with bit pattern corresponding to 2++; and the interval [2+++, infinity) contains too many distinct bit patterns.

Figure 10:
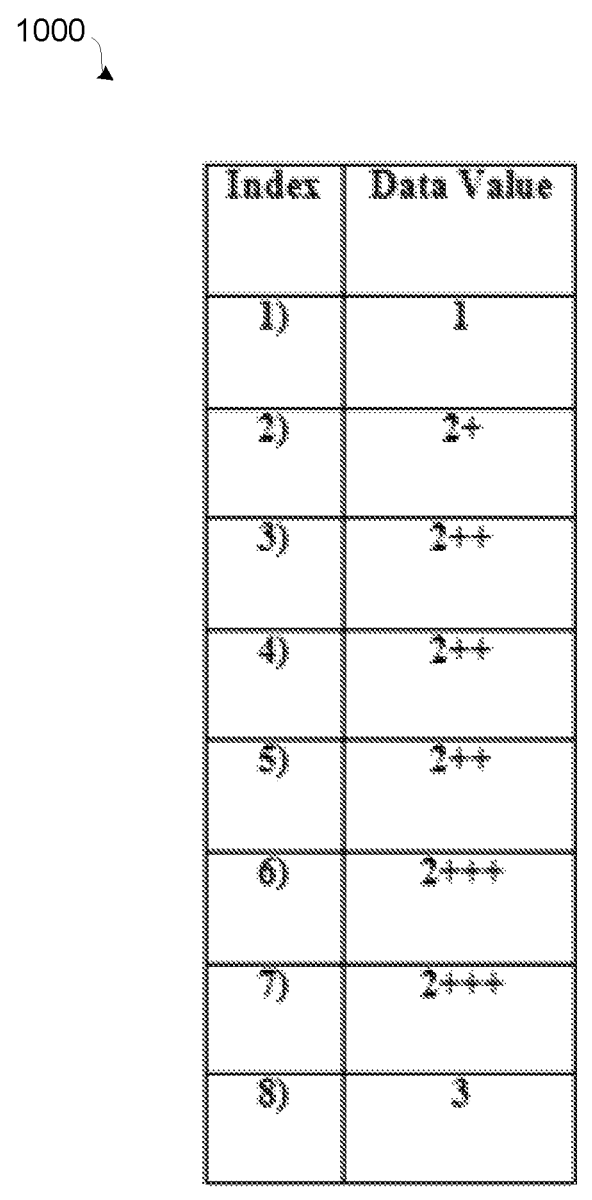

A set of eight data points, based on these five distinct bit patterns, may be defined as shown in table 1000 in FIG. 10. These eight data points include 1, 2+, 2++, 2++, 2++, 2+++, 2+++ and 3. Embodiments of the present technology may be implemented using fewer, more, or different distinct bit patterns and/or fewer, more, or different data points in the set of data points.

FIG. 11 illustrates an example of a table 1100 including data associated with seventeen different data bins associated with an iteration of the algorithm, according to embodiments of the present technology. As noted, the number of intervals or data bins used in each iteration may be predetermined, and in this example the predetermined number of data bins equals seventeen. The number of bins may be changed at any time. However, in one embodiment, the number of bins may stay the same for each iteration until the final iteration, when the number of bins is reduced as in this embodiment. The first column 1101 of table 1100 shows the index of the data bin from 0 to 16 for the seventeen total data bins represented in table 1100. The second column 1102 and third column 1103 of table 1100 include the left point and right point, respectively, associated with each data bin. For example, the data bin in the first row of table 1100 includes a left point of 1 and a right point of 1.125, the bin in the second row of table 1100 includes a left point of 1.125 and a right point of 1.25, and so on. The fourth column 1104 of table 1100 includes a count of the number of data points from within the data set, shown in table 1000 of FIG. 10, fit within each of the data bins. For example, the data bin index 8 with left point 2 and right point 2.125 has a count of 6 because six of the eight data points fit within that bin (the count does not include the right most point—only the left most point and any points in between the left and right most points). The fifth column 1105 of table 1100 shows the cumulative count of the number of data points of the set of eight data points that have been assigned to each data bin. The sixth column 1106 and the seventh column 1107 show the lower and upper bounds of each of the data bins in each column. For example, the data bin index 8 with left point 2 and right point 2.125 has a lower bound of 2+ because 2+ is the value of the lowest data point in that bin, and an upper bound of 2+++ because 2+++ is the value of the highest data point in that bin.

In an example, assume that the quantile to be determined is the percentile at 0.51 (or 51%) of the data set. When an iteration of the algorithm is executed using the data included in table 1100, the data value at 0.51 of the data set is included in data bin 8 (index 8). Therefore, since there three distinct data points (2+, 2++ and 2+++) and six total points (2+, 2++, 2++, 2++, 2+++ and 2+++) within data bin 8 (as shown in the associated row of column 1104), three distinct data points (and 6 total points) will be used for the next iteration (if possible) of the algorithm.

However, since there are only three distinct data points within data bin 8, and therefore three distinct data points that would be used for the next iteration, the algorithm may terminate. The algorithm may terminate because there are not enough points to span across all of the data bins in the predetermined number of seventeen data bins. In other words, if the same number of predetermined data bins is used from the previous iterations, too few points remain for the number of data bins assigned to the next iteration, which may cause the algorithm to terminate after the previous iteration.

To remedy this problem, the predetermined number of data bins, which was set to seventeen data bins for previous iterations, may be changed so that the number of data bins is equal to the number of points (or intervals) remaining from the selected bin in the previous iteration. Changing the predetermined number of data bins allows another iteration to be completed, allowing for convergence to an exact quantile. In other words, this solution removes the possibility that the algorithm will be terminated because there are too many bins compared to the number of points remaining in the convergence. Therefore, the (predetermined) number of data bins for the next iteration is changed from seventeen to four (e.g. a bin for each of the intervals from the selected bin in the previous iteration, and a bin from the maximum value in that selected bin to infinity).

FIG. 12 illustrates an example of a table 1200 including data associated with four different data bins associated with an iteration of the algorithm, according to embodiments of the present technology. As noted, the number of intervals or data bins used in each iteration may be predetermined, and in this example the predetermined number of data bins equals four. This predetermined number of bins was changed from seventeen to four so that the number of bins would equal the number of remaining points being used in the convergence algorithm, as explained above. In other words, the number of distinct points in the selected bin from the previous iteration may be used as the number of bins for the next iteration. The first column 1201 of table 1200 shows the index of the data bin from 0 to 3 to represent the four total data bins represented in table 1200. The second column 1202 and third column 1203 of table 1200 include the left point and right point, respectively, associated with each data bin. For example, the data bin in the first row of table 1200 includes a left point of 1 and a right point of 1.125, the bin in the second row of table 1100 includes a left point of 1 and a right point of 2+, and so on. The fourth column 1204 of table 1200 includes a count of the number of data points from within the data set, shown in table 1000 of FIG. 10, fit within each of the data bins. For example, the data bin index 2 with left point 2++ and right point 2+++ has a count of 3 because three of the eight data points fit within that bin. The fifth column 1205 of table 1200 shows the cumulative count of the number of data points of the set of eight data points that have been assigned to each data bin. The sixth column 1206 and the seventh column 1207 show the lower and upper bounds of each of the data bins in each column. For example, the data bin index 2 with left point 2++ and right point 2+++ has a lower bound of 2++ because 2++ is the value of the lowest data point in that bin, and an upper bound of 2+++ because 2+++ is the value of the highest data point in that bin.

In the current example, it is assumed that the quantile to be determined is the percentile at 0.51 (or 51%) of the data set. When an iteration of the algorithm is executed using the data included in table 1200, the data value at 0.51 of the data set is included in data bin 2 (index 2). This iteration of the algorithm yields a more exact convergence to a quantile including point 2++.

Figure 13A:
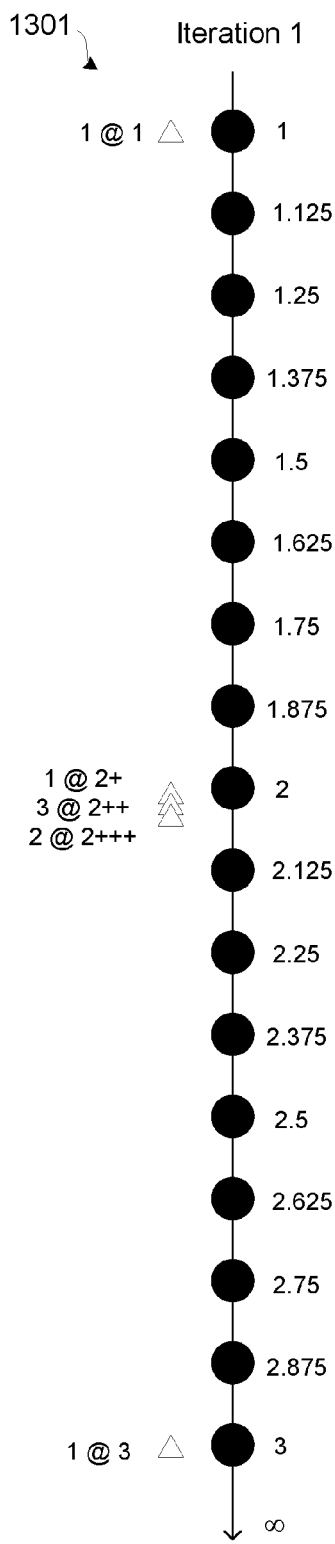
FIGS. 13A and 13B illustrate an example set of two iterations that include convergence to an exact quantile, according to embodiments of the present technology.
Figure 13B:
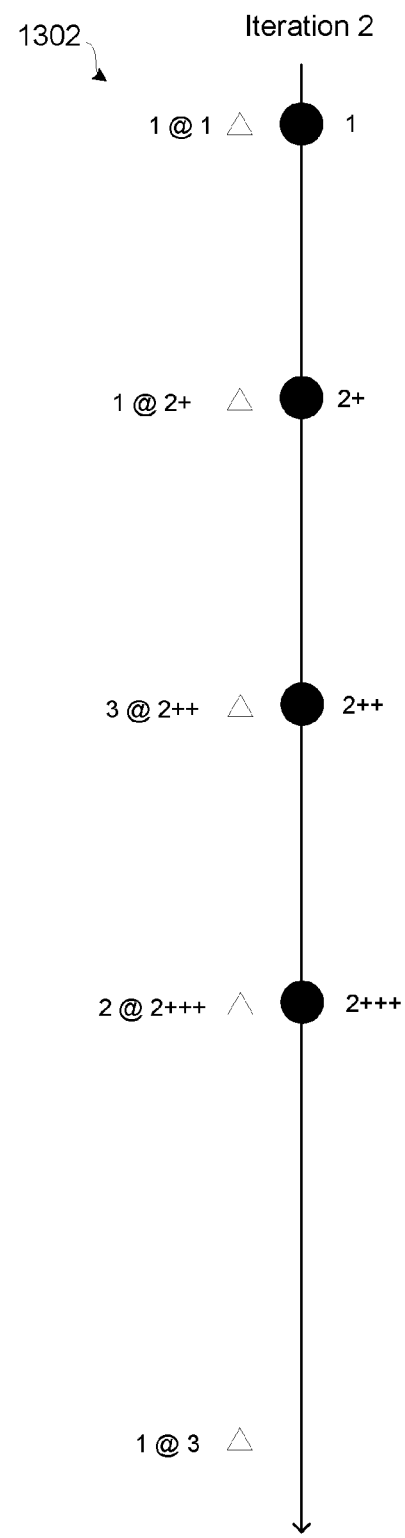

FIGS. 13A-13B illustrate an example set of two iterations that include convergence to an exact quantile, according to embodiments of the present technology. The two iterations illustrated in FIGS. 13A-13B include the data used in the example described herein with respect to FIGS. 10-12. More specifically, FIG. 13A illustrates a graph 1301, which represents the data bins that include the data shown in table 1100 in FIG. 11, and FIG. 13B illustrates a graph 1302, which represents the data bins that include the data shown in table 1200 in FIG. 12.

As shown in FIG. 13A, iteration 1 includes a predetermined number of seventeen bins, ranging from a lower quantile bound of 1 to an upper quantile bound of 3. The number of bins, seventeen, is predetermined in this example, and may have been used for one or more additional iterations before iteration 1. As shown in iteration 1, distinct points 1 (1 total data point), 2+(1 total data point), 2++(3 total data points), 2+++(2 total data points) and 3 (1 total data point) are distributed between the bins based on the upper and lower bounds of each bin. For example, data point 1 is in the bin between 1 and 1.125, data points 2+, 2++ and 2+++ are in the bin between 2 and 2.125, and data point 3 is in the bin between 3 and infinity. If the quantile being applied to iteration 1 is 0.51, then the selected bin to be used in a subsequent iteration is the bin from 2 to 2.125. Since the distinct points 2+, 2++ and 2+++ are included in that bin, those points may be carried over to the next iteration.

Since the number of bins, seventeen, is predetermined and initially carries from iteration to iteration, the next iteration (e.g. iteration 2) may be assumed to contain seventeen bins without a change in the predetermined number of bins. However, it may be determined that a subsequent iteration cannot occur with seventeen bins because of the number of points to be carried over from the selected bin from the previous iteration. Therefore, as shown in FIG. 13B, the predetermined number of bins may be reduced from seventeen (as in iteration 1) to four. The bins for iteration 2 may be chosen based on the distinct points included in the chosen bin from iteration 1. More specifically, the bounds for the bins for iteration 2 may be 2+, 2++, and 2+++(and, for example, 1 as a fourth bound). Therefore, as shown in FIG. 13B, the bins may be as follows: one bin from 1 to 2+, one bin from 2+ to 2++, one bin from 2++ to 2+++, and 1 bin from 2+++ to infinity (as in iteration 1, each iteration may include a bin from the upper bound of the iteration to infinity). Since each bin only includes one distinct data value (although multiple data points of each distinct data value may exist in one or more bins, such as 3 data points of 2++ in a bin), choosing a bin to converge on in iteration 2 yields an exact quantile. For example, if the quantile is 0.51, then the result of iteration 2 may yield a convergence on data value 2++.

Figure 14A:
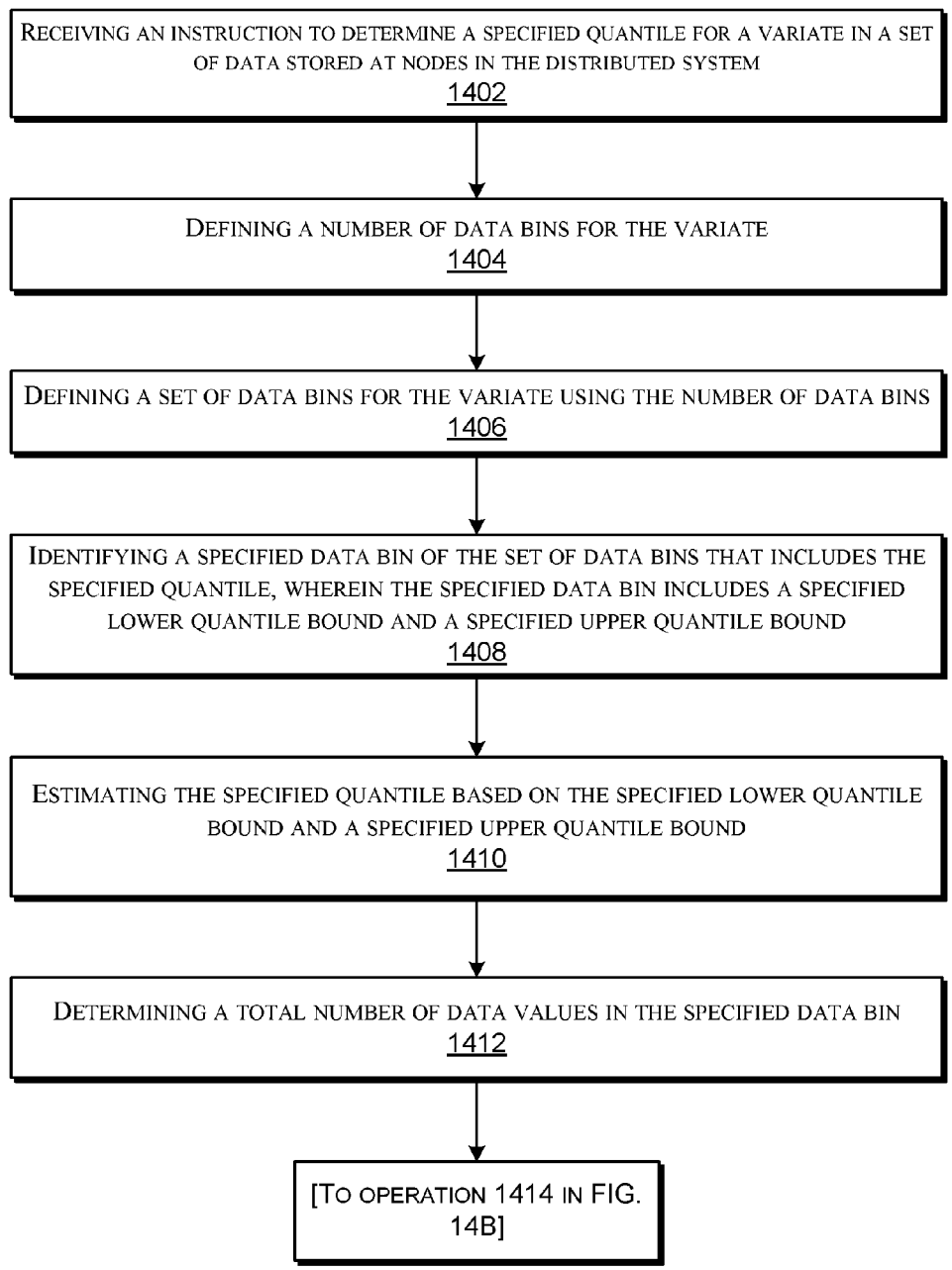
FIGS. 14A and 14B illustrate flow charts showing an example process for determining a more exact quantile for data stored in a distributed system, according to embodiments of the present technology.
Figure 14B:
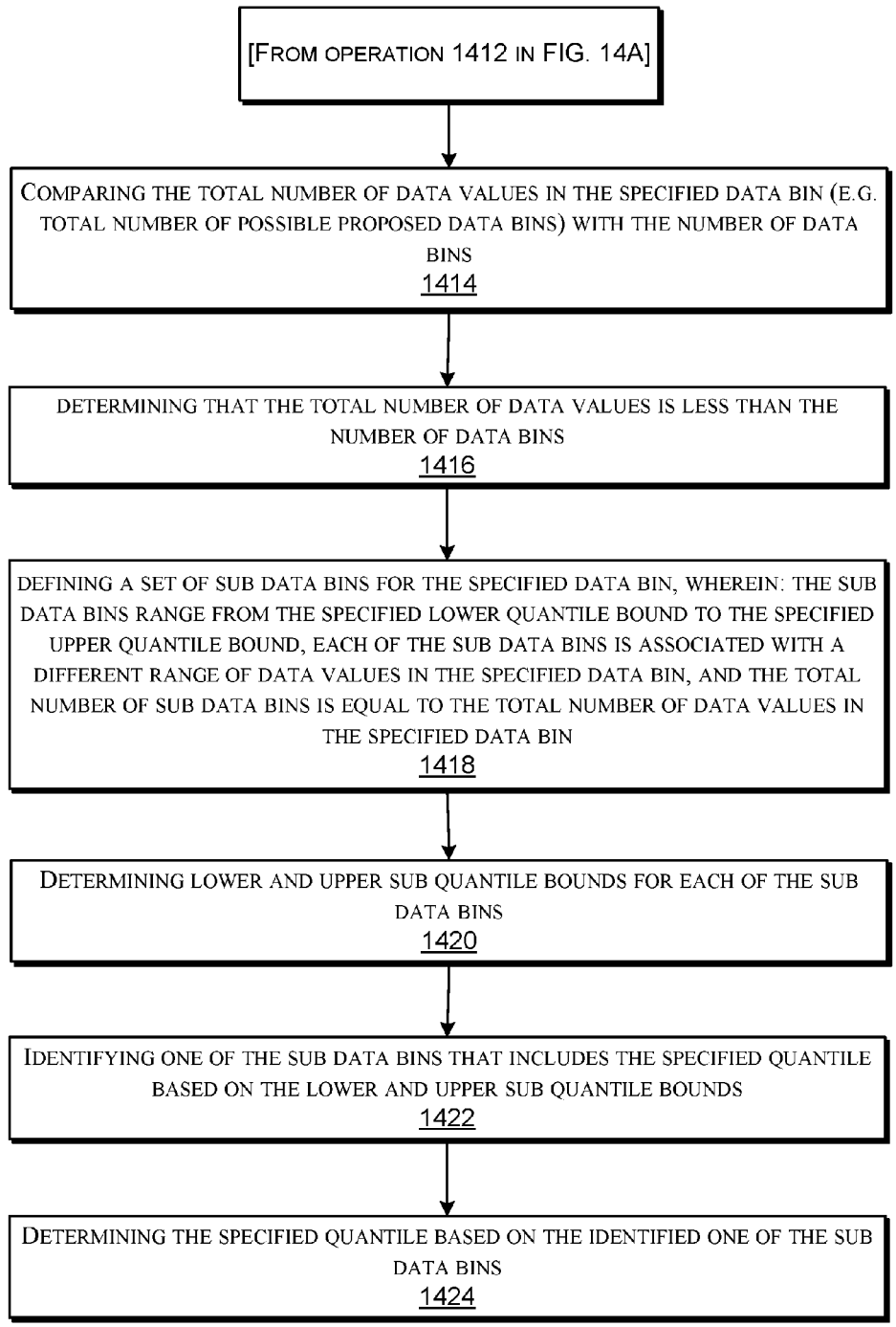

FIGS. 14A-14B illustrate a flow chart showing an example process for determining a more exact quantile for data stored in a distributed system, according to embodiments of the present technology. Each of the following operations may be performed by, for example, the quantile estimation engine or a different engine, such as a quantile determination engine. Operation 1402 includes receiving an instruction to determine a specified quantile for a variate in a set of data stored at nodes in the distributed system. Operation 1404 includes defining a number of data bins for the variate. This operation may include, for example, determining the initial predetermined number of data bins that will be used as the number of data bins for one or several iterations of the process. As noted, this number of data bins may be changed, for example to make it equal to the number of data points in the previous iteration so that another iteration may be performed without the algorithm being terminated.

Operation 1406 includes defining a set of data bins for the variate using the number of data bins. This operation may include, for example, assigning the different points to each of the determined data bins based on the points that are being used in this iteration (e.g. those points that were in the selected data bin from the previous iteration). Operation 1408 includes identifying a specified data bin of the set of data bins that includes the specified quantile, wherein the specified data bin includes a specified lower quantile bound and a specified upper quantile bound. Operation 1410 includes estimating the specified quantile based on the specified lower quantile bound and a specified upper quantile bound. After this operation, the quantile estimation engine may determine if one of the plurality of data bins has converged on the quantile specified. More specifically, the quantile estimation engine may be configured to determine if the quantile has been determined to the predetermined level of precision. If not, then another iteration may be performed (e.g. to converge on the specified quantile).

Operation 1412 includes determining a total number of data values in the specified data bin. This total number of data values may be used to determine the number of data bins (e.g. changing the predetermined number of data bins used in previous iterations) to be used in the next iteration, as shown in the following operations. Operation 1414 includes comparing the total number of data values in the specified data bin with the number of data bins. Operation 1416 includes determining that the total number of data values is less than the number of data bins. Operation 1418 includes defining a set of sub data bins for the specified data bin, wherein: the sub data bins range from the specified lower quantile bound to the specified upper quantile bound, each of the sub data bins is associated with a different range of data values in the specified data bin, and the total number of sub data bins is equal to the total number of data values in the specified data bin.

Operation 1420 includes determining lower and upper sub quantile bounds for each of the sub data bins. Operation 1422 includes identifying one of the sub data bins that includes the specified quantile based on the lower and upper sub quantile bounds. Operation 1424 includes determining the specified quantile based on the identified one of the sub data bins.

As noted, the method described in the operations of FIGS. 14A-14B may be performed by an algorithm or set of algorithms. An example algorithm may be defined as follows. Let a<b. Let I=[a, b) be an interval. Let $\lambda$>0 be an integer. This integer may be adjusted with tight intervals. The interval I can be divided into $\lambda$ subintervals by placing $\lambda$ points spanning [a, b), with $\beta_0$=a and $\beta_\lambda$=b. Points may be spaced differently in a linear or non-linear manner. The number of points $\lambda$ in any interval used in the next iteration. For example, assume $\lambda$=128. However, $\lambda$=128 is not always feasible in tights intervals (e.g. where the number of intervals, 128, is more than the number of remaining points in I. For getting the exact bit pattern of the percentile, the definition of $\lambda$ may be redefined.

Define eps to be the largest $2^n$ for which 1+m eps is equal to 1. In IEEE arithmetic eps=$2^{-53}$. The mantissa of a double precision is another double precision number between [0.5, 1). In C, for example, $$\mathrm{mant}(a) = \mathrm{frexp}(a, \&\mathrm{power\_of\_2}); (\mathrm{or}\ n) \quad (1)$$

The number of distinct doubles in an interval is finite and is computable. For example, define the function NDDP (a, b) to be the number of distinct doubles in an interval to be $$NDDP(a, b) = \frac{\mathrm{mant}(b-a)}{eps} \quad (2)$$

An exact percentile may be determined when eps=0. In this case, the given parameter $\lambda$ may be adjusted in the following way. When the interval width [b, a) is too tight, then we reduce $\lambda$ to be $$\lambda = \mathrm{MIN}(\lambda, NDDP(a,b)) \quad (3)$$

In an example to show the bits and the calculation of N DDP (a, b) is as follows. Let $\lambda$=128. For simplicity we choose an exact bit pattern of a=0.75. We choose b very close to 0.75 such that b>a and b−a is small. In this case, the decimal values of a and b cannot be used. A hexadecimal representation will show the difference between the 2 very close numbers. The returned values may be z=3F E8000000000000, z1=3F E8000000000049, nddp=73. Notice that the bit patterns are so close and do not contain for example 128 different doubles. In that case the number of points in that interval cannot be set to $\lambda$ the initially predefined number of points in the interval rather it should be selected to not exceed 73. If The upper bound computed by N DDP is chosen, and the counts are done, the iteration converges to the exact percentile.

Various benefits exist regarding improvement of computer technology using the technology disclosed herein. For example, when a computer system determines quantiles of a variate in data sets, the technology described herein allows the computer system to determine an exact quantile and value result instead of estimating the quantile. This technology may allow the computer to be more efficient.

Furthermore, the computer system may transmit a message or other correspondence (e.g. an alert) to notify a user, set of users, other computer system, etc. that the system has converged on a quantile. For example, the system may use a server (e.g. transmission server) with a microprocessor and a memory to store preferences of the user(s) to transmit the alert or other notification, transmit the alert from the server over a data channel to a wireless device, and provide a viewer application that causes the notification to display on one or more user computers. The system may also enable a connection from the user computer to the storage that includes the data sets over the internet when a user attempts to connect to the system.

Optionally, notifications may be generated that may be transmitted to and/or displayed by a remote system. For example, a summary report identifying stress scenario specification, transition matrices, output flows, etc. may be generated, for example based on the structure definition, stress scenario specification, and/or input received, and this report may be transmitted to a remote system. Optionally, the remote system may generate a notification of the report in order to alert a user that a determination or generating process is completed. This may advantageously allow a user to remotely initialize a determination or generation processes and then be alerted, such as via a notification wirelessly received on a mobile device, when the processing is complete and a report may be available. Optionally, a report and/or results of the output flow generation may be transmitted over a network connection to a mobile or remote device.

User preferences may be identified to determine which information to include in a report or which results to be provided to a user. Such preferences may facilitate reducing the total information provided to a user, such as via a mobile device, to allow for more expedient transmission and notification. Additionally, there may be significant user requests for remote processing capacity such that a user may need to have prompt notification of completion of a request in order to queue their next request. Such a notification and report alert system may facilitate this.

The systems, methods, and products described herein are useful for data analysis. In one aspect, this disclosure provide tools for analyzing large sets of data, such as large sets of digital data, and converging on fewer or one exact data point within the data set. Aspects of the current disclosure provide technical solutions to the technical problem of how to efficiently sort, process, evaluate and make use of large quantities of digital or electronic data. As such, the problem addressed by this disclosure specifically arises in the realm of computers and networks and this disclosure provides solutions necessarily rooted in computer technology. For example, in embodiments, this disclosure is directed to more than just retrieving and storing the data sets and include aspects that transform the data from one form into a new form through using various big data analysis techniques across multiple iterations that may include filtering, aggregation, prediction, determination and reconciliation processes.

This written description uses examples to for this disclosure, including the best mode, and also to enable a person skilled in the art to make and use this disclosure. The patentable scope may include other examples.

What is claimed is:
1. A computing device, comprising:
    one or more processors; and a memory having instructions stored thereon, which when executed by the one or more processors, cause the computing device to perform operations including:

receiving an instruction to determine a specified quantile for a variate in a set of data stored at nodes in a distributed system;

defining a number of data bins for the variate;

defining a set of data bins for the variate using the number of data bins;

identifying a specified data bin of the set of data bins that includes the specified quantile, wherein the specified data bin includes a specified lower quantile bound and a specified upper quantile bound;

estimating the specified quantile based on the specified lower quantile bound and the specified upper quantile bound;

determining a total number of data values in the specified data bin;

comparing the total number of data values in the specified data bin with the number of data bins;

determining that the total number of data values is less than the number of data bins;

defining a set of sub data bins for the specified data bin, wherein:
the sub data bins range from the specified lower quantile bound to the specified upper quantile bound,
each of the sub data bins is associated with a different range of data values in the specified data bin, and
the total number of sub data bins is equal to the total number of data values in the specified data bin;

determining lower and upper sub quantile bounds for each of the sub data bins;

identifying one of the sub data bins that includes the specified quantile based on the lower and upper sub quantile bounds; and determining the specified quantile based on the identified one of the sub data bins.

2. The computing device of claim 1, wherein the set of sub data bins for the specified data bin is predefined.

3. The computing device of claim 1, wherein each of the sub data bins includes one data value.

4. The computing device of claim 1, further comprising instructions, which when executed by the one or more processors, cause the computing device to perform operations including:
determining a total minimum data value and a total maximum data value within each of the plurality of data bins, wherein the specified quantile is identified using the total minimum data value and the total maximum data value associated with the specified quantile.

5. The computing device of claim 1, wherein the instruction identifies one or more constraints, and the specified quantile is determined subject to the identified one or more constraints.

6. The computing device of claim 1, wherein the set of data bins for the variate include an equidistant set of grid points.

7. The computing device of claim 1, wherein the set of data bins for the variate include a non-uniform set of grid points.

8. The computing device of claim 7, wherein the non-uniform set of grid points is defined based on a location of the specified quantile within the set of data.

9. A computer-program product tangibly embodied in a non-transitory machine-readable storage medium, including instructions configured to cause a data processing apparatus to:

receive an instruction to determine a specified quantile for a variate in a set of data stored at nodes in a distributed system;

define a number of data bins for the variate;

define a set of data bins for the variate using the number of data bins;

identify a specified data bin of the set of data bins that includes the specified quantile, wherein the specified data bin includes a specified lower quantile bound and a specified upper quantile bound;

estimate the specified quantile based on the specified lower quantile bound and the specified upper quantile bound;

determine a total number of data values in the specified data bin;

compare the total number of data values in the specified data bin with the number of data bins;

determine that the total number of data values is less than the number of data bins;

define a set of sub data bins for the specified data bin, wherein:
the sub data bins range from the specified lower quantile bound to the specified upper quantile bound,
each of the sub data bins is associated with a different range of data values in the specified data bin, and
the total number of sub data bins is equal to the total number of data values in the specified data bin;

determine lower and upper sub quantile bounds for each of the sub data bins;

identify one of the sub data bins that includes the specified quantile based on the lower and upper sub quantile bounds; and determine the specified quantile based on the identified one of the sub data bins.

10. The computer-program product of claim 9, wherein the set of sub data bins for the specified data bin is predefined.

11. The computer-program product of claim 9, wherein each of the sub data bins includes one data value.

12. The computer-program product of claim 9, further comprising instructions configured to cause the data processing apparatus to:
determine a total minimum data value and a total maximum data value within each of the plurality of data bins, wherein the specified quantile is identified using the total minimum data value and the total maximum data value associated with the specified quantile.

13. The computer-program product of claim 9, wherein the instruction identifies one or more constraints, and the specified quantile is determined subject to the identified one or more constraints.

14. The computer-program product of claim 9, wherein the set of data bins for the variate include an equidistant set of grid points.

15. The computer-program product of claim 9, wherein the set of data bins for the variate include a non-uniform set of grid points.

16. The computer-program product of claim 15, wherein the non-uniform set of grid points is defined based on a location of the specified quantile within the set of data.

17. A computer-implemented method for determining quantiles for data stored in a distributed system, comprising:

receiving an instruction to determine a specified quantile for a variate in a set of data stored at nodes in the distributed system;

defining a number of data bins for the variate;

defining a set of data bins for the variate using the number of data bins;

identifying a specified data bin of the set of data bins that includes the specified quantile, wherein the specified data bin includes a specified lower quantile bound and a specified upper quantile bound;

estimating the specified quantile based on the specified lower quantile bound and the specified upper quantile bound;

determining a total number of data values in the specified data bin;

comparing the total number of data values in the specified data bin with the number of data bins;

determining that the total number of data values is less than the number of data bins;

defining a set of sub data bins for the specified data bin, wherein:
the sub data bins range from the specified lower quantile bound to the specified upper quantile bound,
each of the sub data bins is associated with a different range of data values in the specified data bin, and
the total number of sub data bins is equal to the total number of data values in the specified data bin;

determining lower and upper sub quantile bounds for each of the sub data bins;

identifying one of the sub data bins that includes the specified quantile based on the lower and upper sub quantile bounds; and determining the specified quantile based on the identified one of the sub data bins.

18. The method of claim 17, wherein the set of sub data bins for the specified data bin is predefined.

19. The method of claim 17, wherein each of the sub data bins includes one data value.

20. The method of claim 17, further comprising:
determining a total minimum data value and a total maximum data value within each of the plurality of data bins, wherein the specified quantile is identified using the total minimum data value and the total maximum data value associated with the specified quantile.

21. The method of claim 17, wherein the instruction identifies one or more constraints, and the specified quantile is determined subject to the identified one or more constraints.

22. The method of claim 17, wherein the set of data bins for the variate include an equidistant set of grid points.

23. The method of claim 17, wherein the set of data bins for the variate include a non-uniform set of grid points.

24. The method of claim 23, wherein the non-uniform set of grid points is defined based on a location of the specified quantile within the set of data.

* * * * *